US 6,658,439 B2

(12) United States Patent
Karasudani

(10) Patent No.: US 6,658,439 B2
(45) Date of Patent: Dec. 2, 2003

(54) FILE SYSTEM

(75) Inventor: Akira Karasudani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 188 days.

(21) Appl. No.: 09/774,687

(22) Filed: Feb. 1, 2001

(65) Prior Publication Data

US 2001/0016841 A1 Aug. 23, 2001

(30) Foreign Application Priority Data

Feb. 23, 2000 (JP) .......................................... 2000-046459

(51) Int. Cl.$^7$ .............................................. G06F 17/30
(52) U.S. Cl. .................. 707/205; 386/95; 707/206; 707/204; 707/201; 707/101
(58) Field of Search .............................. 386/95, 68, 46, 386/128, 75; 707/206, 204, 101, 201, 200, 205; 369/47; 704/200

(56) References Cited

U.S. PATENT DOCUMENTS 6,341,196 B1 * 1/2002 Ando et al. ................... 386/95

* cited by examiner

Primary Examiner—Jean M. Corrielus
Assistant Examiner—Fred Ehichioya
(74) Attorney, Agent, or Firm—Staas & Halsey LLP

(57) ABSTRACT

When an object file is read from a recording medium by a file system, a jump table retrieving section retrieves a unit-record-area number, corresponding to the unit record area to which individual desired data of the object file is allocated or a unit-record-area number near individual desired data, from a jump table corresponding to the object file. And a unit record area retrieving section retrieves a unit record area containing the individual desired data by referring a file allocation table based on the retrieved unit-record-area number. Then an accessing section takes access to the recording medium to read out the individual data recorded in the unit record area. This system realizes high-speed retrieving of intended unit record areas when writing/reading a file to/from the recording medium.

41 Claims, 16 Drawing Sheets

③ TRAVEL FROM 11 TO 2A ON FAT

▨ FAT ENTRY OF ALLOCATED CLUSTER

☐ FAT ENTRY OF UNALLOCATED CLUSTER

| CLUSTER OFFSET | CLUSTER NUMBER |
|---|---|
| 0 | 02 |
| F | 11 |
| 1F | 32 |
| 2F | ... |
| 3F | ... |
| ... | ... |
| 1EF | ... |
| 1FF | ... |

② CLUSTER OFFSET BEING MAXIMUM AND NOT GREATER THAN 17

DISTANCE F BETWEEN CLUSTER OFFSETS

① CURRENT POSITION
ACCESS TO CLUSTER (2A) CORRESPONDING TO CLUSTER OFFSET 17

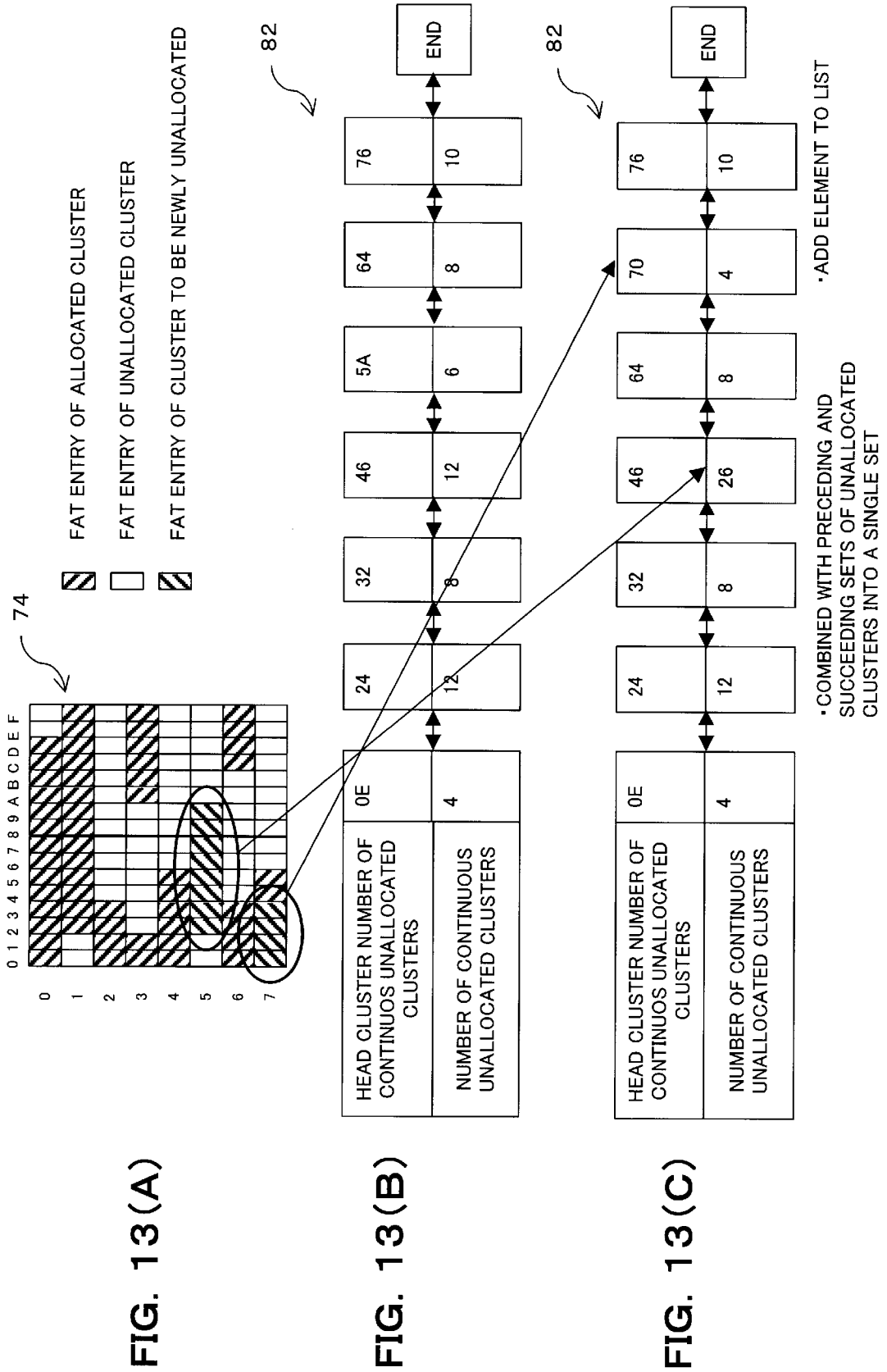

FILE C DELETED BY PC

FILE SYSTEM

BACKGROUND OF THE INVENTION

1. Field of the Invention

The present invention relates to a file system suitable for use in recording a data sequence as a file in a recording medium such as a magnetic storage device.

2. Description of the Related Art

Random access media, such as magnetic discs and magneto-optical discs, have nowadays been taking the place of sequential access media, such as videotapes, which had ever been commonly used as a recording medium for picture data.

These random access media, compared to the sequential access media, have an advantage of giving free data accessing. In an effort to make a better use of such random access media, applications have been studied to perform various kinds of processing, such as simultaneous recording of plural pictures, time-shift replay, immediate replay from a desired position, and simultaneous processing of different types of editing.

In the random access media, a file system stores/manages a data sequence of picture information in files. There has been known a commonly used file system (hereinafter, also called "FAT file system") utilizing a file allocation table (FAT), which file system is used chiefly in operation systems, such as MS-DOS or MS-Windows (trademarks of Microsoft Corporation) of personal computers (PC).

The FAT file system will now be described with reference to FIGS. 2 and 16. FIG. 2 shows hardware of a host computer which the file system is applied to. FIG. 16 shows a conventional FAT file system.

A host computer 1 comprises a CPU 10, a RAM 20, a ROM 30, an input/output (I/O) interface 40, and a bus 50, being connected to a storage 60 via the I/O interface 40.

The CPU 10 controls the RAM 20, the ROM 30, the I/O interface 40, and the storage 60. The ROM 20 and the RAM 30 are internal storages for running applications; the RAM 20 serves as a work area for the application while the ROM 30 stores such application in advance.

The I/O interface 40 inputs/outputs data to/from the storage 60 or other external devices. The CPU 10, RAM 20, ROM 30, and input/output (I/O) interface 40 are interconnected via the bus 50.

The storage 60 records various items of data in a recording medium, such as a magnetic disc and a magneto-optical disc. The description will now be made on a hard disc drive (HDD) equipped with a magnetic disc.

The CPU 10 executes an application stored in the storage 60 or the ROM 30 to function as a file system 70'. The file system 70' divides the recording medium, such as an HDD, into unit record areas, or clusters, to which a data sequence is recorded, and stores/manages the data sequence as a file. The FAT is used for managing the clusters, namely, as to which cluster the data is recorded or which cluster is empty (described later in connection with the conventional art of FIG. 16).

The file system 70' comprises a accessing section 71, a cluster retrieving section 72, a cluster allocating section 73, and an FAT 74.

The cluster allocating section 73 allocates a file (data) to clusters that stores currently no data (hereinafter called "unallocated"). The cluster retrieving section 72 consults with the FAT 74 (described later) to retrieve a particular cluster, namely, a file-stored (hereinafter called "allocated") cluster or an unallocated cluster. The accessing section 71 reads out data from the allocated cluster, which has been retrieved by the cluster retrieving section 72, and writes data to the unallocated cluster, which has been allocated by the cluster allocating section 73.

The FAT 74 manages the clusters of the storage 60, to which clusters a sequence of individual data of a file is allocated. Each entry of the FAT 74 stores also the number of the individual cluster that contains the next part data of the file to manage information about the connection between the allocated clusters in the form of a one-way linked list, thus managing the sequential order of those individual clusters to form the entire file. The FAT 74 manages also unallocated clusters.

With this conventional construction, for reading out data from the recording medium of the storage 60, the cluster retrieving section 72 first consults with the FAT 74 to travel around the individual entries of the FAT 74 one after another until it meets the target cluster that stores desired data, whereupon the accessing section 71 takes access to read out such desired data.

On the other hand, for writing data into the storage 60, the cluster allocating section 73 first activates the cluster retrieving section 72. The cluster retrieving section 72 then consults with the FAT 74 to retrieve an unallocated cluster, whereupon the cluster allocating section 73 allocates data so that the data is written by the accessing section 71.

However, the foregoing conventional file system would encounter the following problems:

(1) The processing, such as fast-forwarding/fast-backwarding of pictures or replaying from a desired picture frame, takes a long time because it requires random access to the recording medium.

For example, in fast-forwarding/fast-backwarding pictures, data has to be read out while jumping forward/backward over the file. Also, the replaying from the desired position requires jumping to the target cluster that stores the desired picture data.

At that time, since the FAT 74 manages information about the connection between the clusters in the form of a one-way link list, the cluster retrieving section 72 must travel around the individual entries of the FAT 74 in a sequential order until it meets the target cluster, which would take a long time to perform the processing. Specifically, if data is read out while fast-backwarding the pictures (jumping backward over the file), the cluster retrieving section 72 needs to travel around the individual entries of the FAT 74 one after another, from the head cluster of the file to a destination cluster, at every backward jumping being performed.

Accordingly, in the processing that requires random access (e.g., jump) to the recording medium, such as fast-forwarding/fast-backwarding of pictures or replaying from a desired picture frame, it would take a rather long time to retrieve a target cluster.

(2) Yet when new picture data is recorded, it still takes a long time to retrieve a cluster that stores no data (unallocated).

The FAT file system 70' uses the FAT 74 to manage as to whether each cluster is allocated or unallocated with data. Therefore, the cluster retrieving section 72 needs to travel around the individual entries of the FAT 74 one after another to retrieve an unallocated cluster. In particular, if only the trailing part of a single string of the clusters in the recording medium is remained empty (unallocated) the cluster retrieving section 72 needs to travel almost all the individual entries of the FAT 74 from the top until it finds an unallocated cluster, which would take a long time.

(3) Generally, in storages (e.g., HDD), of the type in which data is recorded on a disc-shaped recording medium, such as a magnetic disc or a magneto-optical disc, while the medium is rotating, and in which the Zone Constant Angular Velocity Method is employed to control rotation of the medium, the transfer rate for the inner disc region is slower than that for the outer disc region, thus resulting in a difference in transfer ability. Therefore, there is a fear that the picture data, which can be recorded in a sufficient transfer ability at the outer disc region, might not be recorded at the inner disc region.

As a measure to solve this problem, a picture data recording method is currently known in which data recording starts separately from the inner and outer disc regions toward the midst between them to realize an average transfer rate throughout the entire disc region. In the conventional file system, since the top entry and the bottom entry of the FAT 74 correspond to either the inner end position and the outer end position of the recording medium, respectively, or the outer end position and the inner end position of the recording medium, respectively, data must be allocated by the cluster allocating section 73, separately from the top and bottom entries toward the center of the entry string of the FAT 74.

However, in order to start the data allocating from the bottom entry, the cluster retrieving section 72 needs to travel around the individual entries of the FAT 74 one after another from the top entry, which would take a long time.

(4) In the FAT file system 74', for recording and replaying picture data of the same file concurrently, namely, for relaying the file being currently recorded, the same file is opened in duplicate, separately one for recording and one for replaying. At that time, since it cannot be recognized from the replay side that a change is made in information about a file size or a location of the head cluster of the continuous cluster string to which the file is allocated, as the result of the updating process at the recording side, it would occasionally be impossible at the replay side to have access to the updated part of the data.

Accordingly, applications which realize a better use of the above-mentioned advantages of the random access media has been cherished in the field of the file system.

SUMMARY OF THE INVENTION

With the foregoing problems in view, one object of the present invention is to provide a file system in which a unit record area can be retrieved at high speed during recording/reading of a file stored in recording medium.

Another object of the present invention is to provide a file system in which, even if two or more plural processes are simultaneously performed with respect to the same file, a change occurred in file information as the result of one process can be reflected on another process before execution of the latter process, minimizing the influence of one process on the remaining processes.

In order to attain the above objects, according to a first generic feature of the present invention, there is provided a file system for reading an object file from a recording medium in which one or more files are recorded each in the form of a data sequence, comprising: an accessing section for taking access to the recording medium to read out the object file in terms of unit record areas in the recording medium; a file allocation table for managing address information about the unit record areas in which the object file is recorded; a unit record area retrieving section for retrieving particular one or more set of the unit record areas to which the object file is allocated, by referring the file allocation table; one or more jump tables, provided one for each file, in which each jump table (i) location information about individual data locations from the start of each file and (ii) unit-record-area numbers corresponding to the individual data locations are registered in terms of predetermined distances from the start of each file in the file allocation table; and a jump table retrieving section for retrieving a particular unit-recording-area number from one of the jump tables which corresponds to the object file. When the object file is read from the recording medium, the jump table retrieving section retrieves a unit-record-area number corresponding to the unit record area to which desired individual data of the object file is allocated or a unit-record-area number near desired individual data of the object file, and the unit record area retrieving section retrieves a unit record area containing the desired data by referring the file allocation table based on the unit-record-area number retrieved by the jump table retrieving section, and the accessing section reads out the desired individual data recorded in the unit record area retrieved by the unit record area retrieving section.

Preferably, the file system may further comprise a unit record area allocating section for allocating the data of the individual file to the unallocated unit record areas; the file allocation table manages unallocated unit record areas; and after the unit record area allocating section has allocated the last-named data of the individual file to the unallocated unit record areas, the jump table retrieving section extracts the unit-record-area numbers at the predetermined distances to create the jump table corresponding to the individual file.

As another preferred feature, the file system may further comprise a jump table writing section for writing the jump tables to the recording medium so that the one jump table corresponding to the object file is read from the recording medium when the object file is read out.

As still another preferred feature, the jump table corresponding to the object file may be deleted from the recording medium when the object file is deleted.

As a further preferred feature, the file system may further comprise a jump table checking section for checking whether or not the jump table corresponding to the object file exists so that, if the result of the checking by the jump table checking section is negative, the jump table is created based on the file allocation table.

As a still further preferred feature, the file system may further comprise an updated time checking section for comparing an updated time of the object file and an updated time of the jump table corresponding to the object file so that, if the updated time of the object file is more recent than the updated time of the jump table as the result of the checking, the jump table is updated.

As an additional preferred feature, the file system may further comprise a file checking section for checking whether or not the object file corresponding to the jump table exists so that, if the result of the checking by the file checking section is negative, the jump table is deleted.

According to a second generic feature of the present invention, the file system for writing a data sequence to a recording medium as an object file comprises: an accessing section for taking access to the recording medium to write the object file in terms of unit record areas in the recording medium; a file allocation table for managing address information about the unit record areas in which the object file is recorded; a unit record area retrieving section for retrieving a particular one or more sets of the unit record areas to which the object file is allocated, by referring the file allocation table; a unit record area allocating section for allocating the data of the individual file to the unallocated unit record areas; an unallocated unit record area list in which (i) a unit-record-area number of the start of each of continuous unallocated unit record areas of different isolated sets in the recording medium and (ii) the number of the continuous unallocated unit record areas of each set, succeeding from the starting unallocated unit record area, are registered in correlation with one another and in which (iii) relation information symmetrically liking such information registered for each set with that registered for other sets is registered; and an unallocated unit record area list retrieving section for retrieving an isolated set of continuous unallocated unit record areas by referring the unallocated unit record area list. When the object file is written to the recording medium, the unallocated unit recording area retrieving section retrieves the unallocated unit record area; the unit recording area allocating section allocates individual data of the object file to the unallocated record areas retrieved by the unallocated unit recording area retrieving section, and unit record areas to which individual data of the object file is allocated are deleted from the unallocated unit record area list.

According to a third generic feature of the present invention, the file system for writing a sequence of data to a recording medium as an object file and reading the object file from the recording medium comprises: an accessing section for taking access to the recording medium to write/read the object file in terms of unit record areas in the recording medium; a file allocation table for managing address information about the unit record areas in which the object file is recorded; a unit record area retrieving section for retrieving particular one or more sets of the unit record areas to which the object file is allocated, by referring the file allocation table; one or more jump tables, provided one for each file, in which each jump table (i) location information about individual data locations from the start of each file and (ii) unit-record-area numbers corresponding to the individual data locations are registered in terms of predetermined distances from the start of each file in the file allocation table; a jump table retrieving section for retrieving a particular unit-recording-area number from one of the jump tables which corresponds to the object file; a unit record area allocating section for allocating the data of the individual file to the unallocated unit record areas; an unallocated unit record area list in which (i) a unit-record-area number of the start of each of continuous unallocated unit record areas of different isolated sets in the recording medium and (ii) the number of the continuous unallocated unit record areas of each set, succeeding from the starting unallocated unit record area, are registered in association with one another and in which (iii) relation information symmetrically liking such information registered for each set with that registered for other sets is registered; and an unallocated unit record area list retrieving section for retrieving an isolated set of continuous unallocated unit record areas by referring the unallocated unit record area list. When the object file is written to the recording medium, the unallocated unit recording area retrieving section retrieves the unallocated unit record area, and the unit recording area allocating section allocates individual data of the object file to the unallocated record areas retrieved by the unallocated unit recording area retrieving section, and unit record areas to which individual data of the object file is allocated are deleted from the unallocated unit record area list. When the object file is read from the recording medium, the jump table retrieving section retrieves a unit-record-area number corresponding to the unit record area to which desired individual data of the object file is allocated or a unit-record-area number near desired individual data of the object file, and the unit record area retrieving section retrieves a unit record area containing the desired data by referring the file allocation table based on the unit-record-area number retrieved by the jump table retrieving section; and the accessing section reads out the desired individual data recorded in the unit record area retrieved by the unit record area retrieving section.

Preferably, the unallocated unit record area list may be created when a power switch is turned on or the recording medium is inserted. As another preferred feature, information about unit recording areas having newly become unallocated when the object file is deleted may be added to the unallocated unit record area list.

As still another preferred feature, the unallocated unit record area list may be recorded in the recording medium when a power switch is turned off or the recording medium is ejected, and also the unallocated unit record area list may be read from the recording medium when the power switch is turned on or the recording medium is inserted.

As a further preferred feature, the file system may further comprise: a file list writing section for writing a file list, in which file names of the files recorded in the recording medium and times of creation of the recorded files are registered in association with one another, when the power switch is turned off or the recording medium is ejected; and a file list comparing section for comparing content of the file list written in the recording medium with the files actually recorded in the recording medium, so that if the content of the file list written in the recording medium is different from the files actually recorded in the recording medium as the result of the comparing, the unallocated unit record area list is updated, based on information about the actually recorded files, when the power switch is turned on or the recording medium is inserted.

As a still further preferred feature, the file system may further comprise a file information duplicating section for duplicating file information over various processes for one and the same file prior to such processing of the last-named file.

With the file system of the present invention, it is possible to guarantee the following advantageous results:

(1) In reading an object file from the recording medium, since the jump table retrieving section retrieves a unit-record-area number corresponding to the unit record area to which desired individual data of the object file is allocated or a unit-record-area number near the desired individual data of the object file, it is possible to retrieve desired data at high speed, particularly during retrieving in the descending order of the unit-record-are numbers.

(2) It is possible to create a jump table consistent with actual unallocated unit record areas.

(3) Since a jump table, which has been recorded in the recording medium, is readout from the recording medium at the read-out of the file, it is unnecessary to create the jump table at each read-out of the file, thus speeding up the processing.

(4) Effective use of the recording medium can be achieved.

(5) After searching for a jump table corresponding to the object file, if it is judged that no such jump table is present, the jump table is created based on the FAT. As the result, the jump table corresponding to the object file is provided so that a unit record area can be retrieved at high speed.

(6) An updated time of the object file and an updated time of the corresponding jump table are compared. If the updated time of the object file is more recent than that of the jump table, then the jump table is updated to make the file consistent with the jump table all the time, thus improving the reliability.

(7) In writing the object file to the recording medium, an unallocated unit record area is retrieved based on an unallocated unit record area list so that the unallocated unit record area can be retrieved at high speed.

(8) Partly since the unallocated unit record area list is written to the recording medium when a power switch is turned off or the recording medium is ejected, and partly since the unallocated unit record area list is read out from the recording medium when the power switch is turned on or the recording medium is inserted, it is unnecessary to create the unallocated unit record area list at each read-out of the file after turning-off of the power switch or ejecting of the recording medium. This speeds up the processing.

(9) Since the file stored in the recording medium is made consistent with the unallocated unit record area list every time the power switch is turned on or the recording medium is inserted, an increased degree of reliability can be guaranteed.

(10) If two or more processes are simultaneously performed with respect to the same file, file information is duplicated over the individual processes for the same file prior to execution of the processing. A change occurred in the file information due to one process can thus be reflected on another process prior to execution of the latter process, minimizing the influence of one process upon the remaining individual processes.

Other objects and further features of the present invention will be apparent from the following detailed description when read in conjunction with the accompanying drawings.

BRIEF DESCRIPTION OF THE DRAWINGS

FIGS. 13A, 13B, and 13C are diagrams respectively illustrating an FAT, an unallocated cluster list before updated, and an unallocated cluster list after updated;

DESCRIPTION OF THE PREFERRED EMBODIMENTS

Various embodiments of the present invention will now be described with reference to the accompanying drawings.

Figure 1:
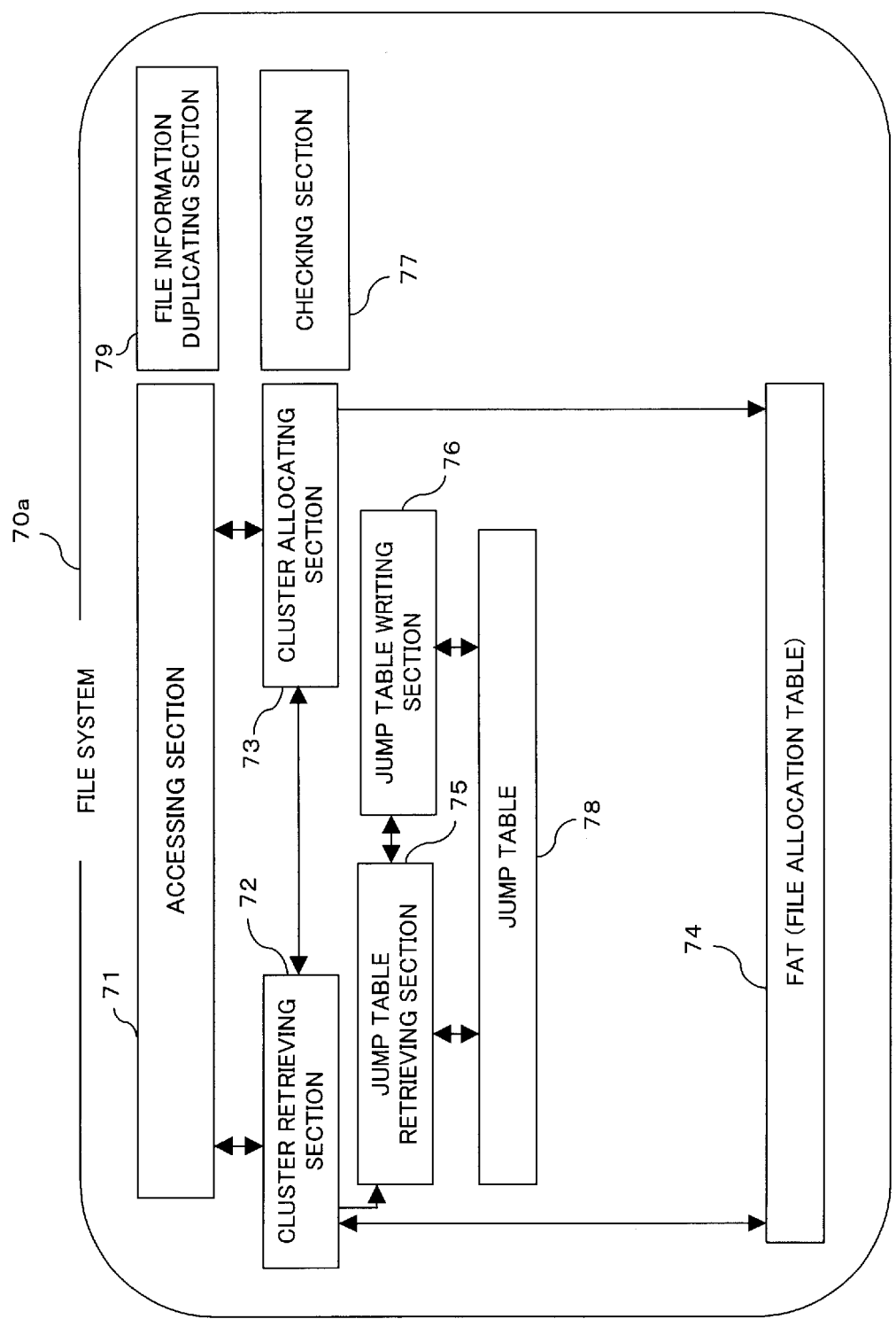
FIG. 1 is a block diagram schematically showing a file system according to a first embodiment of the present invention.
Figure 2:
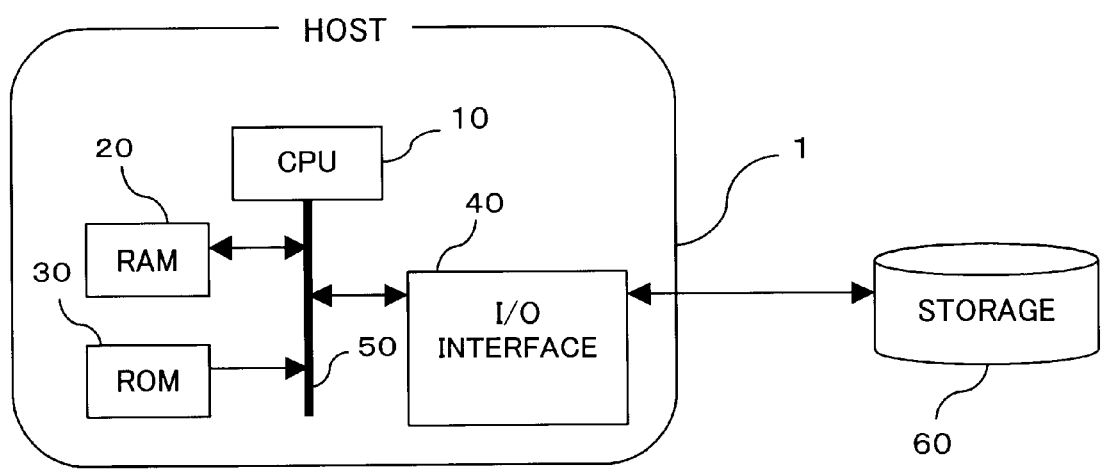
FIG. 2 is a block diagram schematically showing hardware of a host computer to which the file system of the first embodiment is applied.

(A) First Embodiment:

FIG. 1 schematically shows a file system according to a first embodiment of the present invention; FIG. 2, hardware of a host computer to which the file system is applied to; and FIGS. 3A and 3B, a file allocation table (FAT) and a jump table, respectively. Like reference numbers designate similar parts or elements throughout several views of the present embodiment and the conventional art, which is described above in connection with FIG. 16, so their description is omitted here.

Figure 16:
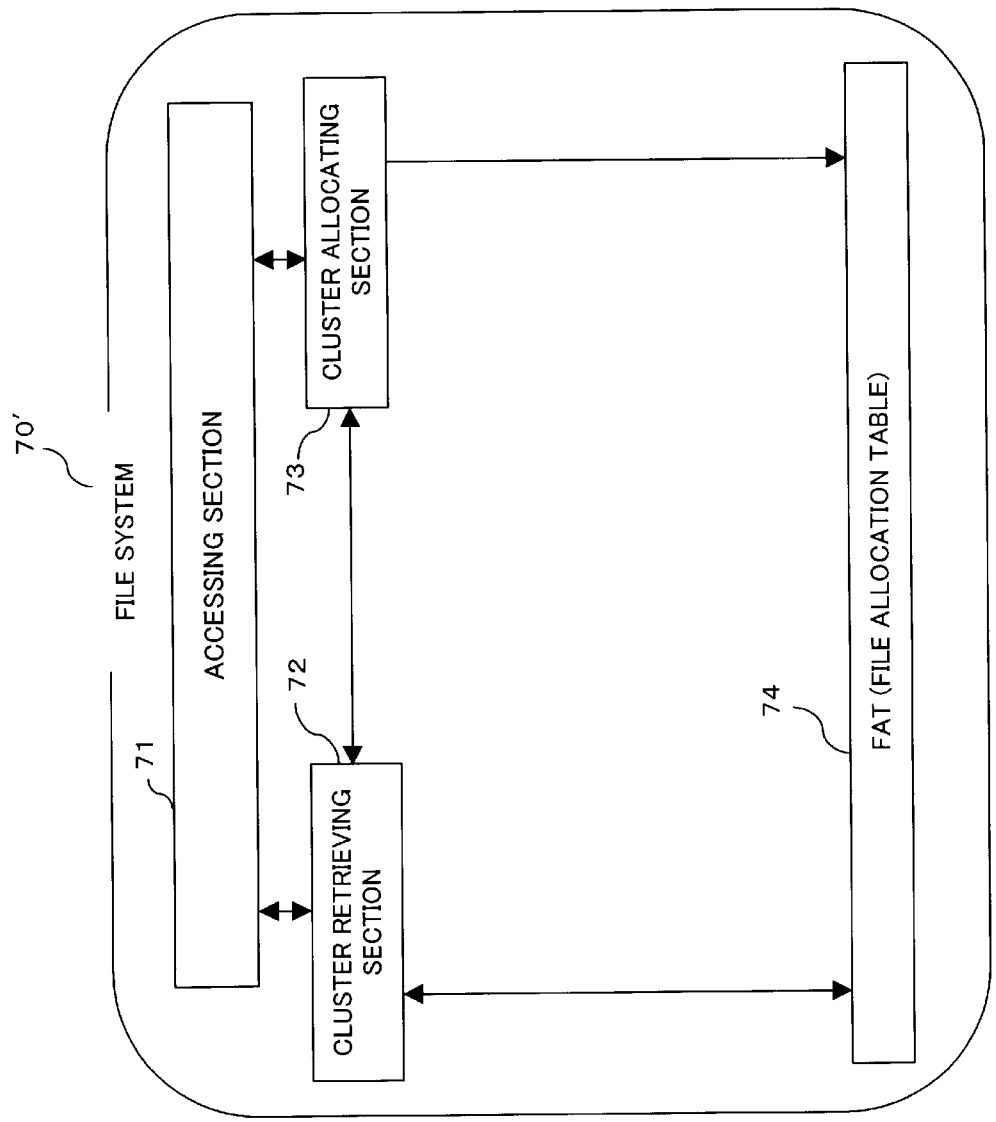
FIG. 16 is a block diagram schematically showing a conventional FAT file system.

A file system 70a of the first embodiment, like the file system 70' of the conventional art of FIG. 16, is applied to a host computer as of FIG. 2 and reads/writes a data sequence from/to a storage (recording medium) 60 as a file.

The storage 60, from which the file system 70a of the first embodiment reads out a file, is equipped with a recording medium for recoding data, such as a magnetic disc or a magneto-optical disc. In the magnetic and magneto-optical discs, a file (data sequence) is recorded in one or more clusters (unit record areas), each of which clusters is the smallest unit of disc region to store the data.

As shown in FIG. 1, the file system 70a comprises an accessing unit 71, a cluster retrieving section (unit record area retrieving section) 72, a cluster allocating section (unit record area allocating section) 73, a file allocation table (FAT) 74, a jump table retrieving section 75, a jump table writing section 76, a checking section 77, and a jump table 78.

In use, these functions of the file system 70a of the first embodiment are provided by a CPU 10.

Figures 3A, 3B:
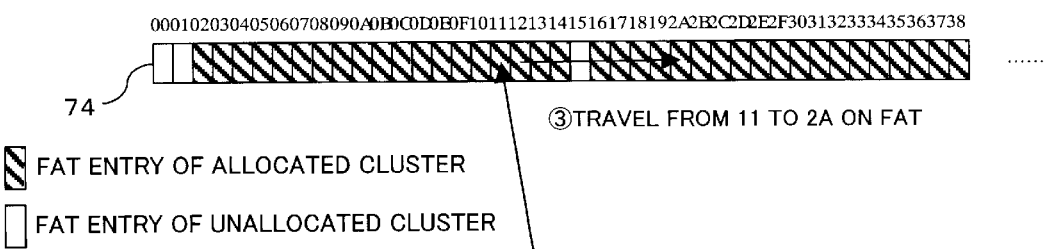
FIGS. 3A and 3B are diagrams schematically illustrating a file allocation table (FAT) and a jump table, respectively.

As shown in FIG. 3A, the file allocation table (FAT) 74 manages location information about locations of the clusters to which a file is allocated and their sequential order to form an entire file. In the FAT 74 of FIG. 3A, the FAT entries, which are provided one for each cluster, show whether or not their corresponding clusters are being currently used.

Partly since the FAT entries correspond to the respective clusters and partly since FAT entry numbers are identical with the corresponding cluster numbers, an (FAT) entry will be hereinafter also called "cluster" for convenience of explanation.

This FAT 74 makes it possible to read/write a file from/to the recording medium, even if the file-stored clusters are located discontinuously on the recording medium.

The jump table 78, which is provided one for each file, registers location information about the locations of individual data from the start of the file and the cluster numbers corresponding to the individual data locations at predetermined distances from the start of the file on the FAT 74.

Specifically, the jump table 78 as of FIG. 3B holds cluster offsets (the number of clusters from the start of the file: F in hexadecimal notation in FIG. 3B) of the individual data and their corresponding cluster numbers as extracted from the FAT 74 at every predetermined number of entries (clusters) from the start of the file.

In FIG. 3A, a single continuous string of rectangles represents a sequence of FAT entries of the file.

The jump table 78 is created by the jump table retrieving section 75 (described later) accompanying the creation of a new file.

The distance between cluster offsets in the jump table 78 can be set arbitrarily depending on a user's desired degree of performance: the smaller the distance, the shorter the time needed to retrieve a cluster but with the size of the jump table 78 being increased.

In FIG. 13B, the distance between the cluster offsets of the jump table 78 is set to F in hexadecimal notation. However, the present invention should by no means be limited to this illustrated example, and various changes or modifications may be suggested without departing from the gist of the invention.

The jump table writing section 76 records and manages the jump table 78. The jump table writing section 76 writes the jump table 78 to the recording medium after the jump table retrieving section 75 creates the jump table 78, and reads out the jump table from the recording medium to extend the read-out jump table 78 on the RAM 20 when the file is read out from the recording medium.

With this construction, it is unnecessary for the jump table retrieving section 75 to create a jump table 78 at each access to the recording medium or at each turning-on of the power switch, thus speeding up the processing.

Meanwhile, for deleting a file in the recording medium, the jump table writing section 76 deletes in the RAM 20 or the recording medium the jump table 78 corresponding to the file to be deleted. It is therefore possible to eliminate a file-less jump table 78 devoid of any corresponding data file so that the whole recording areas of the recording medium can be effectively used.

The jump table retrieving section 75 consults with the jump table 78 to retrieve a particular cluster number. Specifically, the jump table retrieving section 75 retrieves a cluster number corresponding to the cluster to which a desired file (data) is allocated or a cluster number near the desired data. Also, the jump table retrieving section 75 extracts cluster numbers at predetermined distances to create the jump table 78.

To examine a consistency of the file with the jump table 78, the checking section 77 checks whether or not the jump table 78 corresponding to the object file exists thus serving as a jump table checking section. If the checking section 77 has judged that no such jump table exists, the jump table retrieving section 75 creates such jump table 78 based on the FAT 74.

If the checking section 77 has detected no jump table 78 corresponding to the file as the file is a copy of the original file produced by a PC, the cluster retrieving section 72 travels around the individual entries of FAT 74 one after another. And if a cluster offset can be divided by the distance in the jump table 78, it is possible to create a new entry and add it to the jump table 78.

In this manner, a jump table 78 can be created also for a copy of the original file made by the PC so that random access to the storage 60 can be taken at high speed.

Using a PC or the like, a file already stored in the recoding medium can be edited or deleted as well as the same file can be copied in the recording medium as a new file. To use the edited file in another system, the checking section 77 examines a consistency between the file and its corresponding jump table 78.

Figure 7:
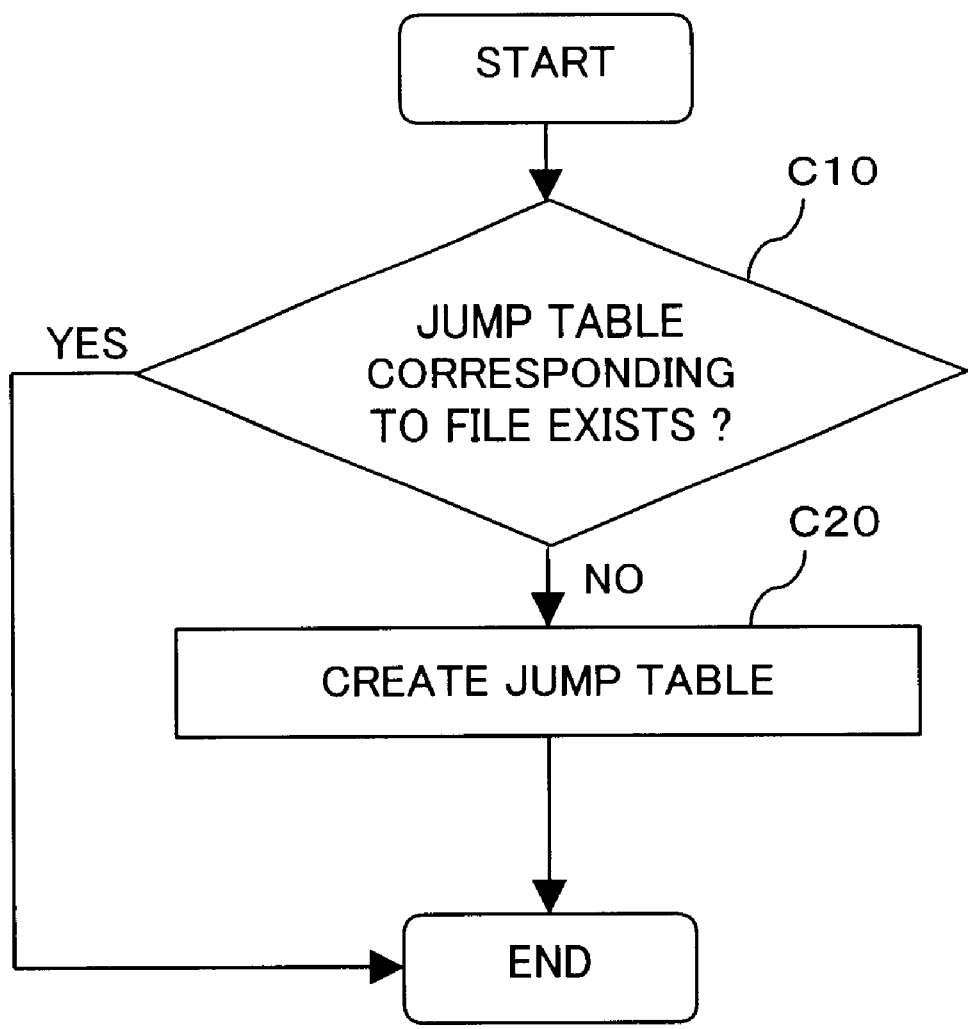
FIG. 7 is a flowchart illustrating how to check a jump table by a checking section of the first embodiment.

The operation of the checking section 77 of the first embodiment as a jump table checking section will now be described with reference to the flowchart (steps C1 through C20) of FIG. 7.

The checking section 77 checks whether or not a jump table 78 corresponding to an object file exists (step C10). If such jump table 78 does not exist (NO route of step C10), the jump table retrieving section 75 creates such jump table 78 (step C20).

Otherwise, if such jump table 78 exists (YES route of step C10), the operation of the checking section 77 terminates.

Further, the checking section 77 serves also as an updated time checking section to compare an updated time of the object file with that of the corresponding jump table 78. If the checking section 77 has judged that the updated time of the file is more recent than the updated time of the jump table 78 as the file has been edited, the jump table retrieving section 75 updates the jump table 78.

Figure 8:
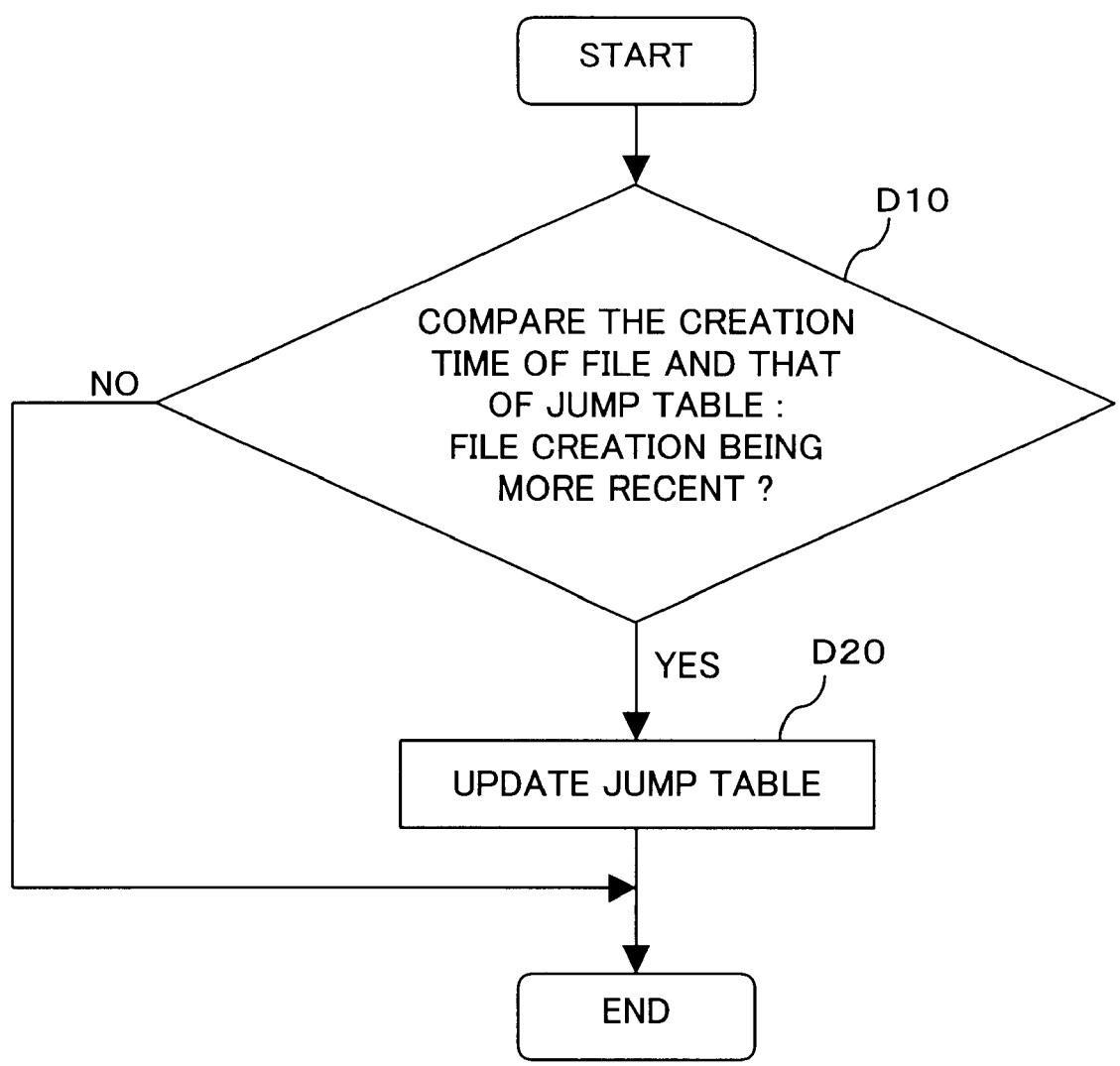
FIG. 8 is a flowchart illustrating how to check an updated time by the checking section of the file system of the first embodiment.

The operation of the checking section 77 as the updated time checking section will now be described with reference to the flowchart (steps D10 through D20) of FIG. 8.

The checking section 77 compares an updated time of an object file with that of a jump table 78 corresponding to the object file (step D10). If the updated time of the file is more recent than that of the jump table (YES route of step 10), the jump table retrieving section 75 updates the jump table 78 corresponding to the file (step D20).

Otherwise if the updated time of the file is not more recent than that of the jump table 78 (NO route of step 10), the operation of the checking section 77 terminates without updating the jump table 78.

Further, the checking section 77 serves still also as a file checking section to discriminate whether or not the file corresponding to a jump table exists. If only the jump table 78 exists in an external storage area 60 as the corresponding file is deleted by a PC, for example, the jump table checking section 77 deletes the isolated jump table 78 whose corresponding file no longer exists.

The operation of the checking section 77 as the file checking section will now be described with reference to the flowchart (steps E10 through E20) of FIG. 9.

Figure 9:
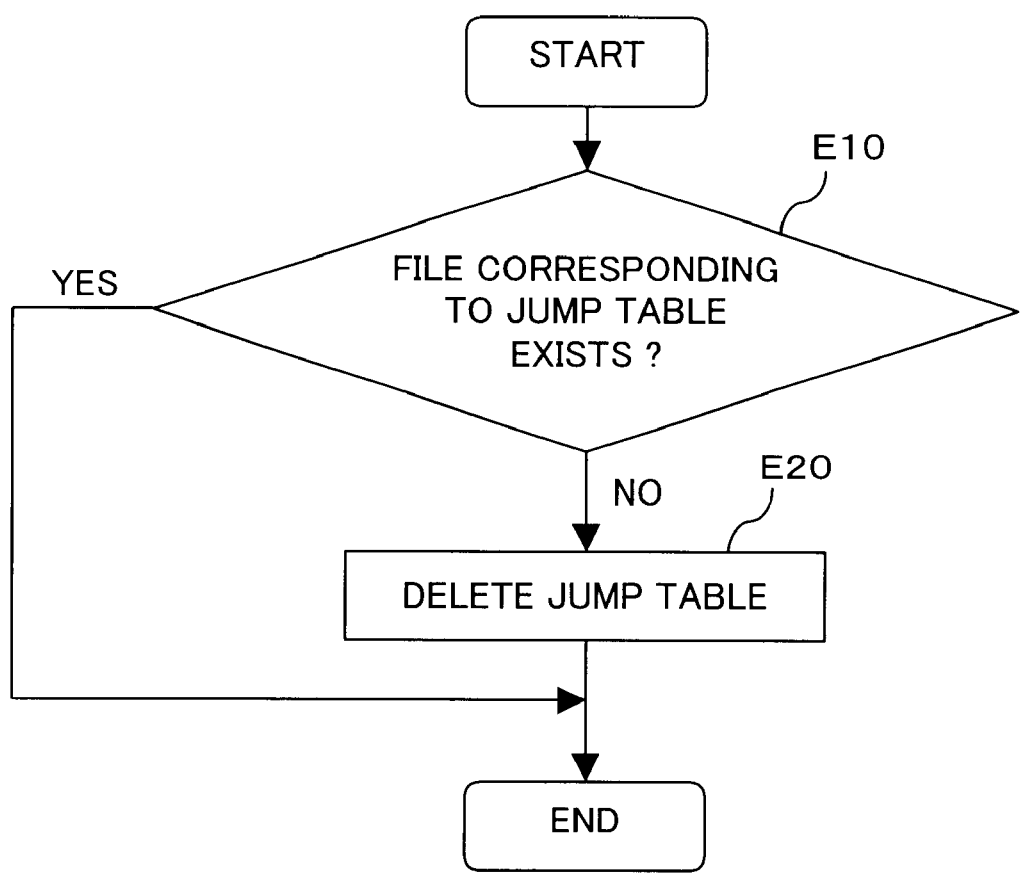
FIG. 9 is a flowchart illustrating how to check a file by the checking section of the file system of the first embodiment.

The checking section 77, as shown in FIG. 9, checks whether or not the file corresponding to a jump table 78 exists (step E10). If no such file exists (NO route of step E10), the jump table 78 is deleted (step E20).

Otherwise if such file exists (YES route of step E10), the operation of the checking section 77 terminates.

Namely, the checking section 77 checks (i) whether or not a jump table 78 corresponding to the object file exists, (ii) the updated time of the file and that of the corresponding jump table 78, and (iii) whether or not a file corresponding to the jump table 78 exists, in order to establish a consistency between the file and the jump table 78 as a need arises.

If two or more processes are performed with respect to the same file, the file information duplicating section 79 duplicates file information over various individual processes prior to execution of the processes of the last-named file.

For example, for time-shift replay of pictures of one file, or for replay of the file during the recording of the same file, the object file is opened in duplicate, one for replaying (hereinafter called "replay-side file information") and the other for recording (hereinafter called "recording-side file information"). In this case, the latest information about the recording-side file is copied to the replay-side file information to make the two files consistent one another prior to the replaying process by the replay-side file information.

At that time, the file information duplicating section 79 copies information having been changed by the recording-side file information to the replay-side file information prior to accessing the file.

Figure 4:
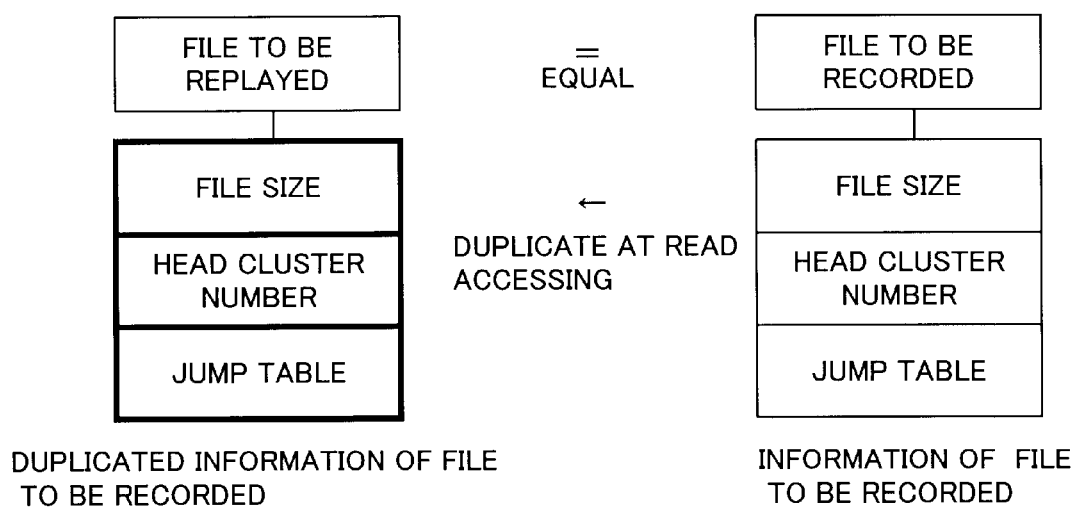
FIG. 4 is a diagram schematically illustrating file information, which is duplicated by a file information duplicating section of the first embodiment for synchronization of processes.

FIG. 4 illustrates file information that is duplicated by the file information duplicating section 79 of the first embodiment. As shown in FIG. 4, information, such as the file size, the head cluster number of a single continuous cluster string to which the file is allocated, and the jump table 78, is copied from the recording-side file information to the replay-side file information, thus establishing a consistency between the replay-side file information and the recording-side file information.

Specifically, as the information to be copied to the replay-side file information, the file size and the head cluster number of the continuous cluster string, to which the file is allocated, are used. And if the jump table 78 is used, the jump table 78 is also copied.

These pieces of information are then copied to the replay-side file so that it is possible to have access to the updated data from the replay side. At the recording side, in the meantime, the jump table 78 created by the jump table retrieving section 75 is copied to the replay side so that fast-forwarding/fast-backwarding and jumping can be performed at high speed during time-shift replay.

Figure 5:
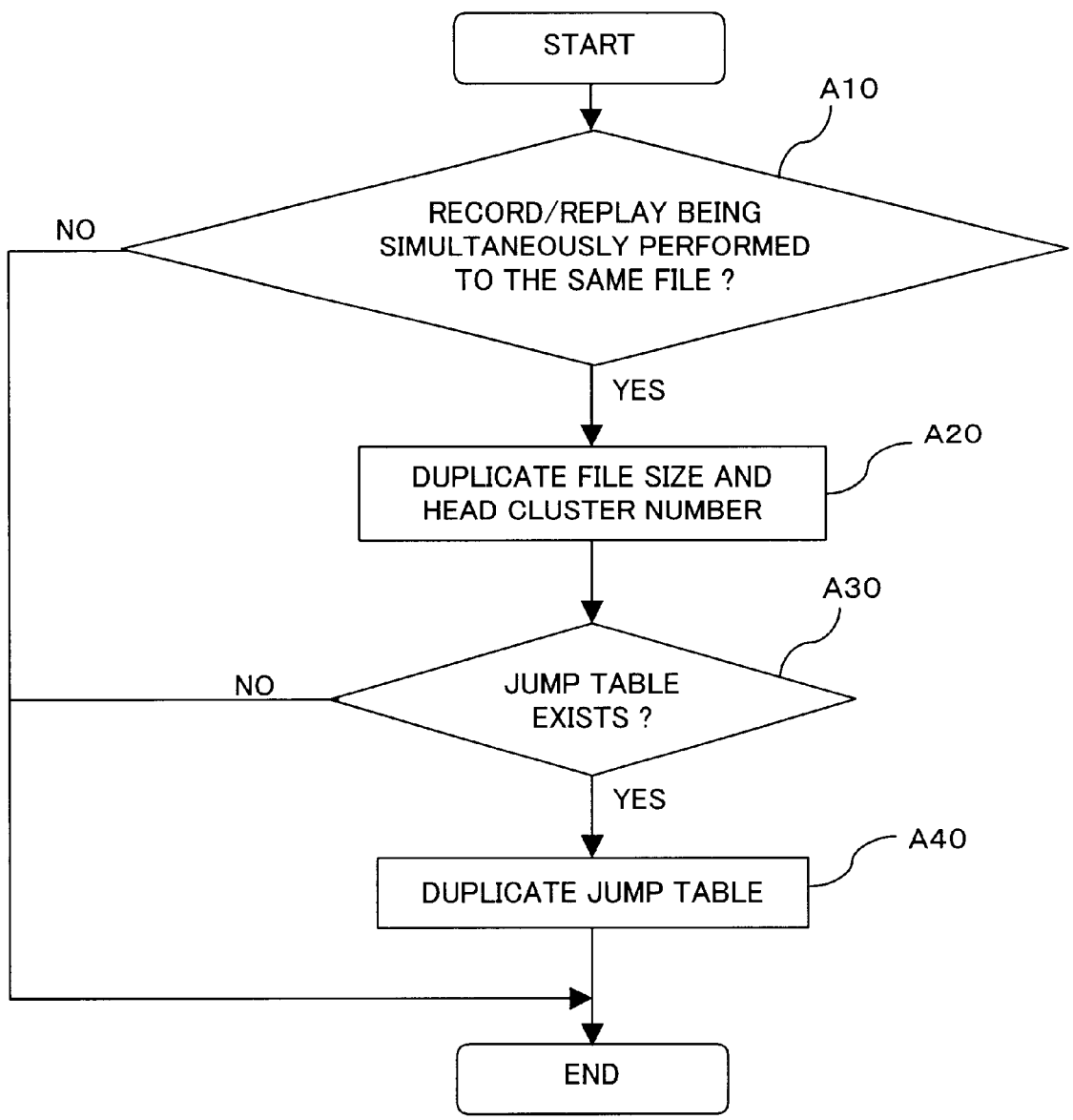
FIG. 5 is a flowchart illustrating a file information duplication over different processes for the same file in the file system of the first embodiment.

How to duplicate file information for two or more processes with respect to the same file will now be described with reference to the flowchart (steps A10 through A40) of FIG. 5.

Firstly, the file information duplicating section 79 discriminates whether or not a file being recorded and replayed at the same time exists (step A10). If such file exists (YES route of step A10) the file size and the head cluster number, in which a change or changes has occurred due to the processing of the recording side, are duplicated between the processes when the file is read out at the recording side (step A20).

Secondly, the checking section 77 discriminates whether or not a jump table 78 corresponding to the file exists (step A30). If such jump table 78 exists (YES route of step A30), the file information duplicating section 79 copies the jump table 78 from the recording side to the replay side (step A40), whereupon the operation of the checking section 77 terminates.

Otherwise either if no such file exists (NO route of step A10) or if no such jump table 78 exists (NO route of step A30), the operation of the checking section 77 terminates.

With this construction, for reading out the data stored in the recording medium, the cluster retrieving section 72 firstly calls the jump table retrieving section 75. The jump table retrieving section 75 then consults with the jump table 78, which is managed by the jump table writing section 76, to retrieve the cluster number nearest to the desired location.

Figure 6:
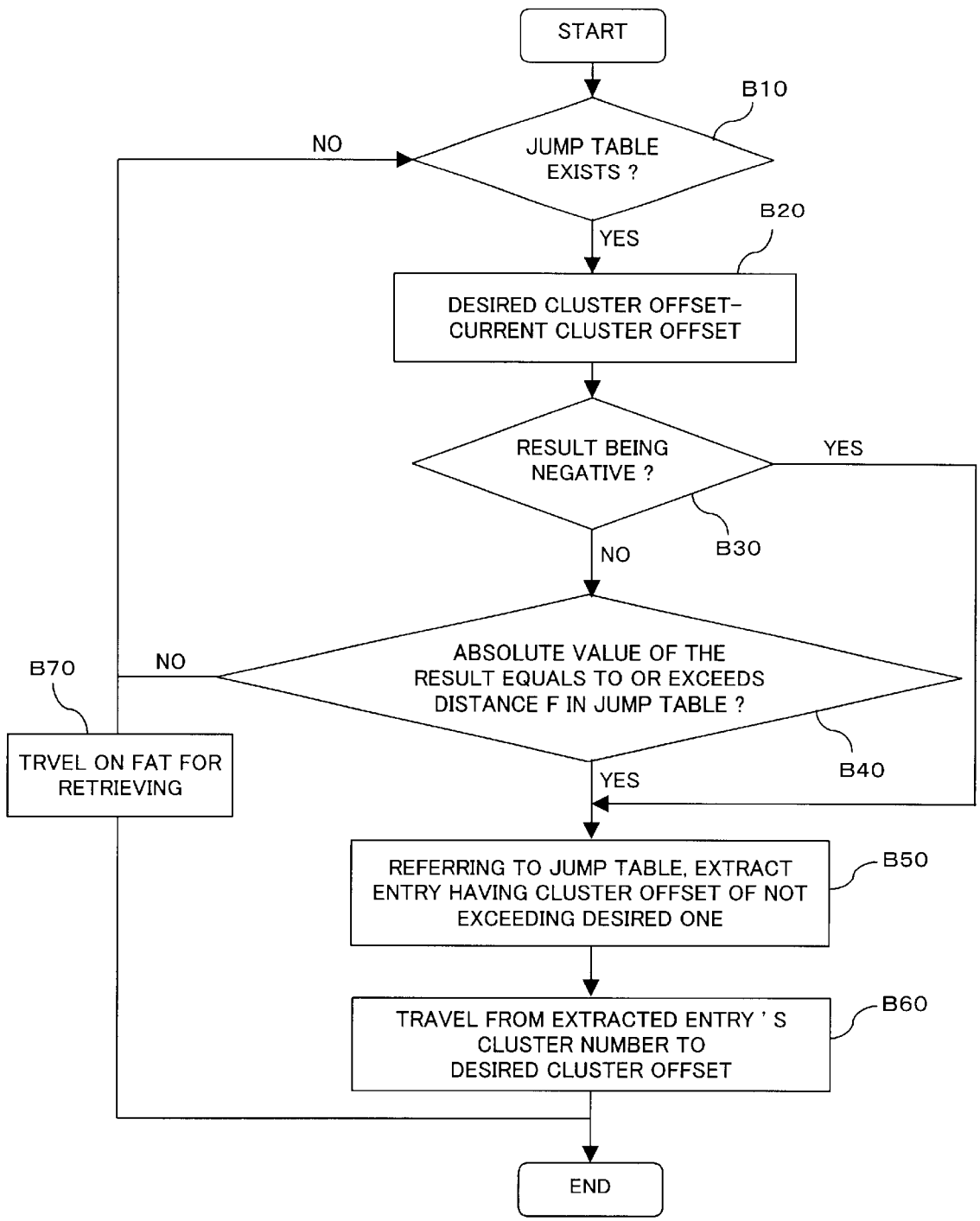
FIG. 6 is a flowchart illustrating how to retrieve a jump table by a jump table retrieving section of the file system of the first embodiment.

How to retrieve a jump table 78 by the jump table retrieving section 75 of the first embodiment will now be described with reference to the flowchart (steps B10 through B70) of FIG. 6.

Firstly, the checking section 77 discriminates whether or not a jump table 78 exists (step B10). If no object jump table 78 exists (NO route of step B10), the cluster retrieving section 72 travels around the individual entries of the FAT 74 one after another to retrieve the cluster number to which desired data is allocated (step B70), whereupon the processing of the checking section 77 terminates.

Otherwise if the jump table 78 exists (YES route of step B10), the jump table retrieving section 75 consults with the jump table 78 to retrieve the cluster number. The jump table retrieving section 75 calculates (desired cluster offset)−(current cluster offset) to obtain how many clusters lie between the current cluster offset and the desired cluster offset to be accessed (step B20).

Assuming that, as shown in FIG. 3B, the cluster offset of the current access position is 1EF and that access is now to be taken to the data stored in a particular cluster (e.g., cluster number 2A, for example) having a desired cluster offset of 17, 17−1EF=−1D8 is calculated.

Secondly, the jump table retrieving section 75 discriminates whether or not the result of the calculation has a negative sign (step B30). If the result of the calculation has a negative sign (YES route of step B30), the jump table retrieving section 75 consults with the jump table 78 to extract an entry having a cluster offset of not exceeding the desired cluster offset (step B50).

In FIGS. 3A and 3B, for example, as the sign of the calculation result is negative (−1D8), the jump table retrieving section 75 consults with the jump table 78 to obtain an entry having a cluster offset of not exceeding the desired cluster offset of 17. As a result, the thus obtained cluster offset and cluster number are F and 11, respectively.

At that time, the reason why the entry of the jump table 78 having the cluster offset of not exceeding 17 is calculated is that the FAT 74 is a one-way link list prohibiting traveling around the individual entries backward, namely, in the descending direction of the cluster numbers.

After that, the cluster retrieving section 72 travels around the individual entries of the FAT 47 one after another from the cluster number (11 in FIG. 3B) obtained from the jump table 78 to the desired cluster number (2A in FIG. 3B) to obtain the desired data (step B70).

Otherwise if the calculation result has a positive sign (NO route of step B30), the jump table retrieving section 75 discriminates whether or not the absolute value of the computation result is equal to or longer than the distance in the jump table 78 or the distance between the cluster offsets (F in FIG. 3) (step B40).

If the absolute value is smaller than the distance between the cluster offsets in the jump table 78 (NO route of step B40), the cluster retrieving section 72 travels around the individual entries of the FAT one after another (step B70), whereupon the process of the cluster retrieving section 72 terminates.

Otherwise if the absolute value is equal to or larger than the distance in the jump table 78 (YES route of step B40), the procedure goes to step B50. Namely, if the absolute value of the computation result is equal to or larger than the distance in the jump table 78 even when access is taken in the forward direction, the jump table 78 will be used.

After that, the jump table retrieving section 75 sends back the retrieved cluster number to the cluster retrieving section 72, which then travels around the individual entries of the FAT one after another from the cluster number (11), which is received from the jump table retrieving section 75, to the desired cluster number (2A) (step B60). The thus found cluster (cluster number 2A) is then read out from the recording medium by the accessing unit 71.

In this manner, with the file system 70a of the first embodiment, for reading out the object file from the recording medium, the jump table retrieving section 75 retrieves from the jump table the cluster number corresponding to the cluster to which the desired data is allocated or the cluster number near the last-named cluster. Therefore, the desired data can be retrieved at high speed particularly when the cluster number smaller than the current one is to be retrieved.

At that time, even if the jump table retrieving section 75 takes access to the FAT 74 in the backward direction, it is possible to retrieve the cluster number using the jump table 78. Otherwise even if access is taken by the jump table retrieving section 75 to the FAT 74 in the forward direction, the use of the jump table 78 enables high-speed retrieving of the cluster number if the absolute value of the computation result is equal to or larger than the distance in the jump table 78.

The FAT 74 manages unallocated clusters, and the jump table retrieving section 75 extracts cluster numbers at predetermined distances to create the jump table 78 after the cluster allocating section 73 allocates data to unallocated clusters, thus streamlining the creation of the jump table 78 consistent with the actual unallocated clusters.

Partly since the jump table 78 is written in the recording medium, and partly since the jump table 78 is read out from the recording medium when the file is read out, it is unnecessary to create such jump table 78 at each read-out of the file, thus speeding up the processing.

Further, for deleting the file, the jump table 78 corresponding to the file also is deleted in the recording medium so that the recording medium can be effectively used.

Also, if the checking section 77 has judged that no such file corresponding to the jump table 78 exists, the isolated jump table 78, which has no corresponding file, is deleted so that the recording medium can be used with increased effectiveness.

Furthermore, if the checking section 77 has judged that a jump table 78 corresponding to the file does not exist, such jump table 78 is created based on the FAT 74 as by copying the original file on a PC, thus speeding up random accessing.

In addition, if the checking section 77 has judged that the updated time of the file is more recent than that of the jump table 78, the jump table 78 is updated to make the file consistent with the jump table 78 all the time, thus improving the reliability.

Still further, for performing two or more processes concurrently with respect to the same file, the file information duplicating section 79 duplicates file information over the individual processes for the same file prior to such processing. As a result, a change occurred in the file information due to the process at the recording side is reflected on the replay side prior to execution of the processing at the replay side, thus minimizing the influence of the processing of the recording side upon the replay side.

Figure 10:
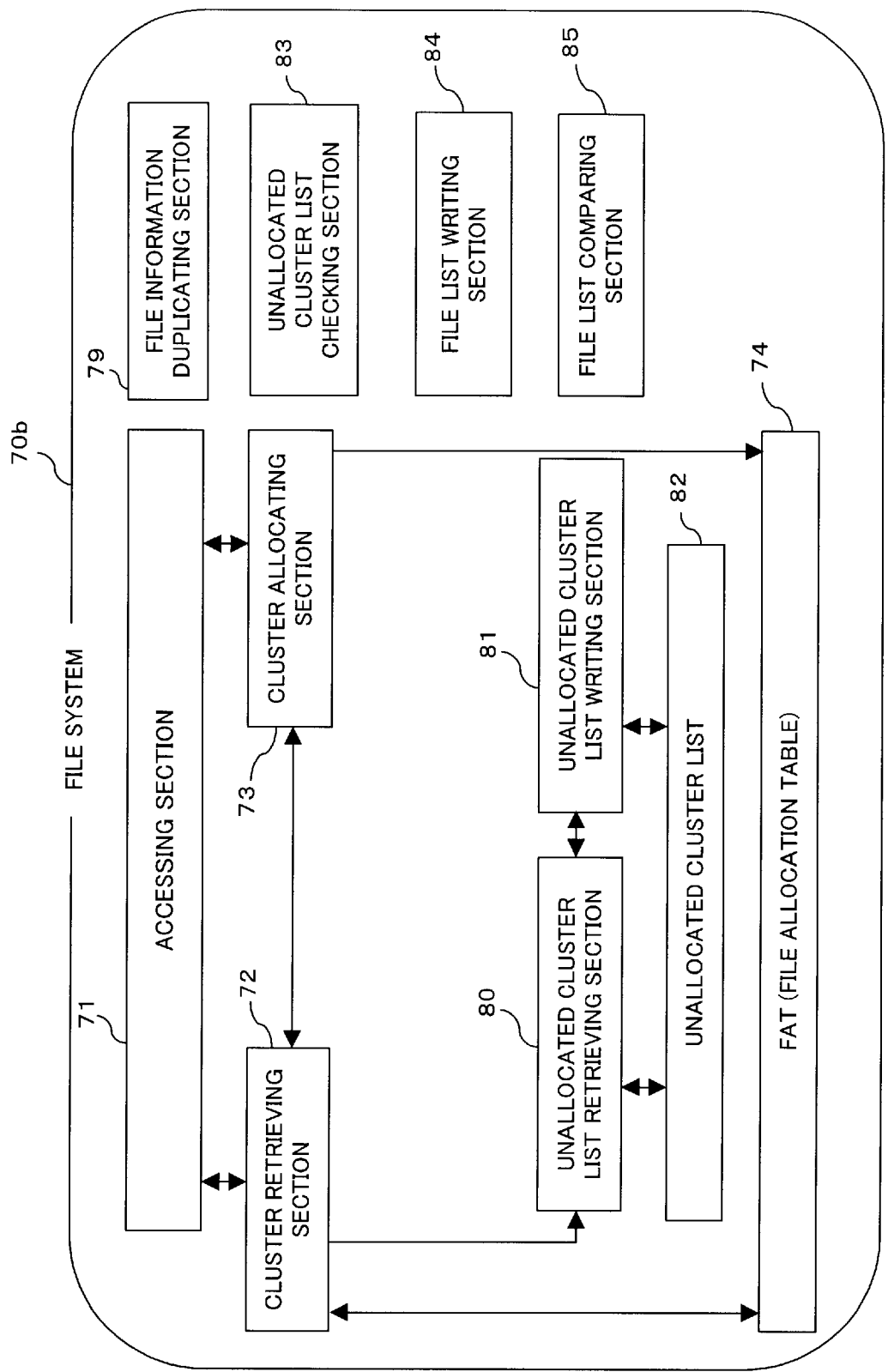
FIG. 10 is a block diagram schematically showing a file system according to a second embodiment of the present invention.
Figures 11A, 11B, 11C:
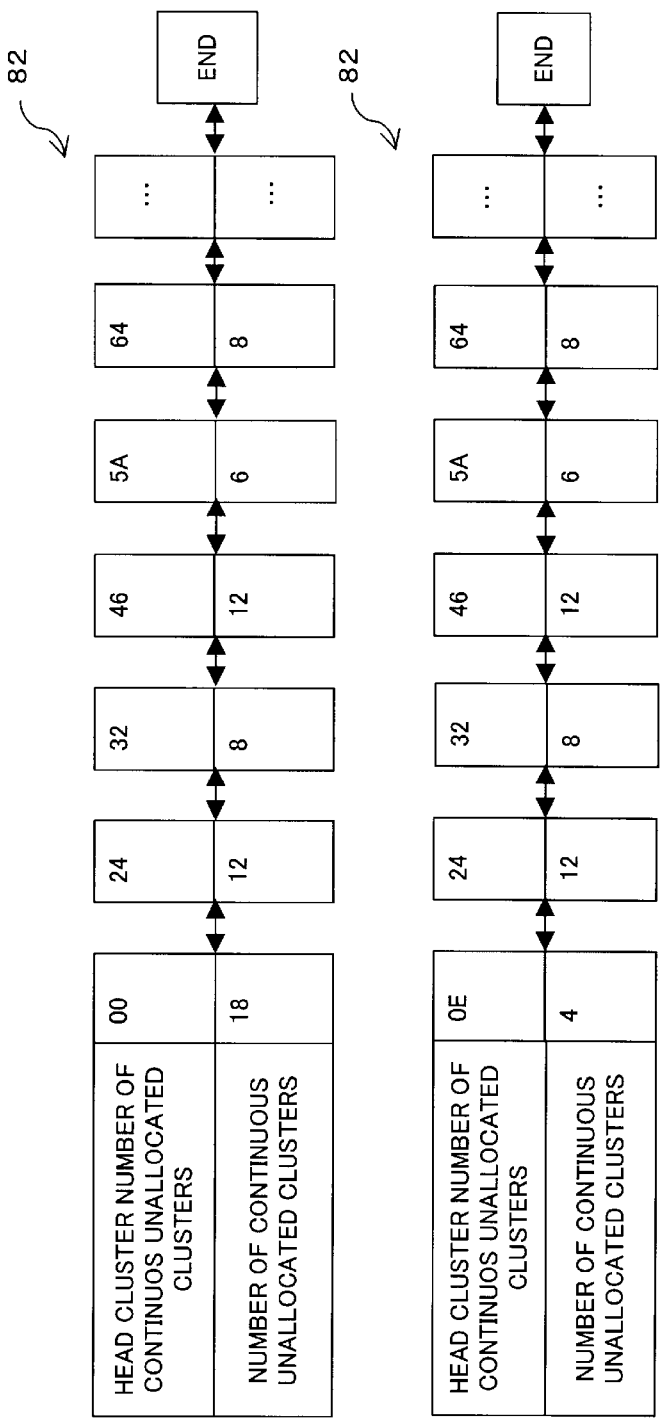
FIGS. 11A, 11B, and 11C are diagrams respectively illustrating an FAT, an unallocated cluster list before updated, and an unallocated cluster list after updated.

(B) Second Embodiment:

FIG. 10 schematically shows a file system of a second embodiment of the present invention; FIG. 11A, the FAT 74; FIG. 11B, an unallocated cluster list before updated; and FIG. 11C, shows an unallocated cluster list after updated. Like reference numbers designate similar parts or elements throughout several views of the first and the second embodiments, so their description is omitted here.

The file system 70b of the second embodiment, like the conventional file system 70' of FIG. 16, is applied to the host computer of FIG. 2, for example, and records a data sequence as a file in the storage (recording medium) 60.

The storage 60, in which the file system 70b of the second embodiment records a file, includes a recording medium such as a magnetic disc or a magneto-optical disc, in which the data is recorded. In the magnetic disc or the magneto-optical disc, the file (data) is recorded in units of clusters (unit record areas).

The file system 70b of the second embodiment, as shown in FIG. 10, comprises an accessing unit 71, a cluster retrieving section (unit record area retrieving section) 72, a cluster allocating section (unit record area allocating section) 73, a file allocation table (FAT) 74, an unallocated cluster list retrieving section (unallocated unit record area list retrieving section) 80, an unallocated cluster list writing section (unallocated unit record area list writing section) 81, an unallocated cluster list (unallocated unit record area list) 82, an unallocated cluster list checking section (unallocated unit record area list checking section) 83, a file list writing section 84, and a file list comparing section 85.

In use, these functions of the file system 70b of the second embodiment are provided by a CPU 10.

The unallocated cluster list 82 as of FIGS. 11B and 11C registers the head cluster number in a continuous unallocated-clusters series and the number of the continuous unallocated clusters in correlation with one another, and also registers relation information interconnecting the head cluster number and the number of unallocated clusters in a continuous series.

In the unallocated cluster list 82, the number of the continuous unallocated clusters counts the head one of the continuous unallocated clusters. The elements of the unallocated cluster list 82 are linked with a non-illustrated two-way linked list (symmetrically linked list), so that it is possible to travel around the individual elements of the unallocated cluster list 82 in either the forward direction or the backward direction.

The unallocated cluster list 82 is read/managed by the unallocated cluster list writing section 81 (described later).

The accessing section 71 records a file in the recording medium of the storage 60 at individual clusters. During the writing, the accessing section 71 specifies the number of clusters to be called from the cluster allocating section 73 to allocate the file. After writing the data into a string of the clusters to be allocated, the accessing section 71 calls the cluster allocating section 73 to write the remaining data to the adequate number of clusters.

The cluster allocating section 73 allocates data to unallocated clusters, and it calls the cluster retrieving section 72 and also the unallocated cluster list retrieving section 80 via the cluster retrieving section 72. Also, the cluster allocating section 73 consults with the unallocated cluster list 82 to alter the information about file allocation in the FAT 74 into "allocated".

If the unallocated cluster list 82 does not exist, the cluster retrieving section 72, like in the conventional file system 70', travels around the individual entries of the FAT 74 one after another starting from the top entry.

The unallocated cluster list writing section 81 writes/manages the unallocated cluster list 82.

Figure 14A:
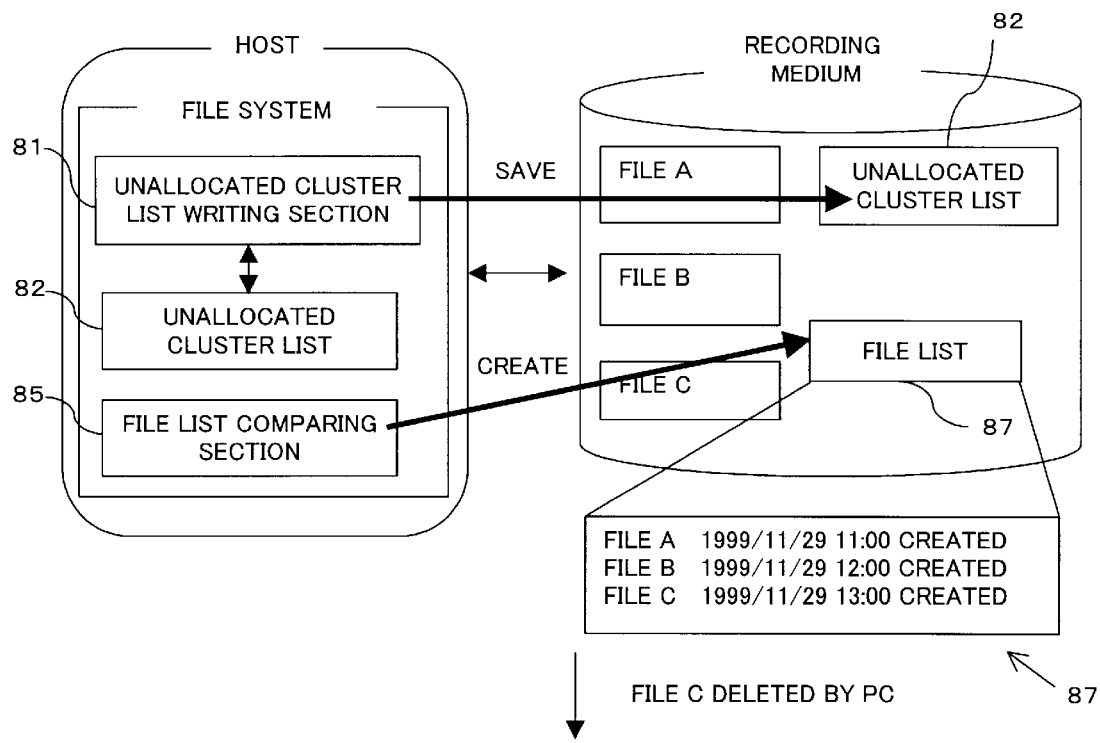
FIGS. 14A and 14B are diagrams respectively illustrating the processes of various parts when a power switch is turned off or the recording medium is ejected, and the processes of various parts when the power switch is turned on or the recording medium is inserted.
Figure 14B:
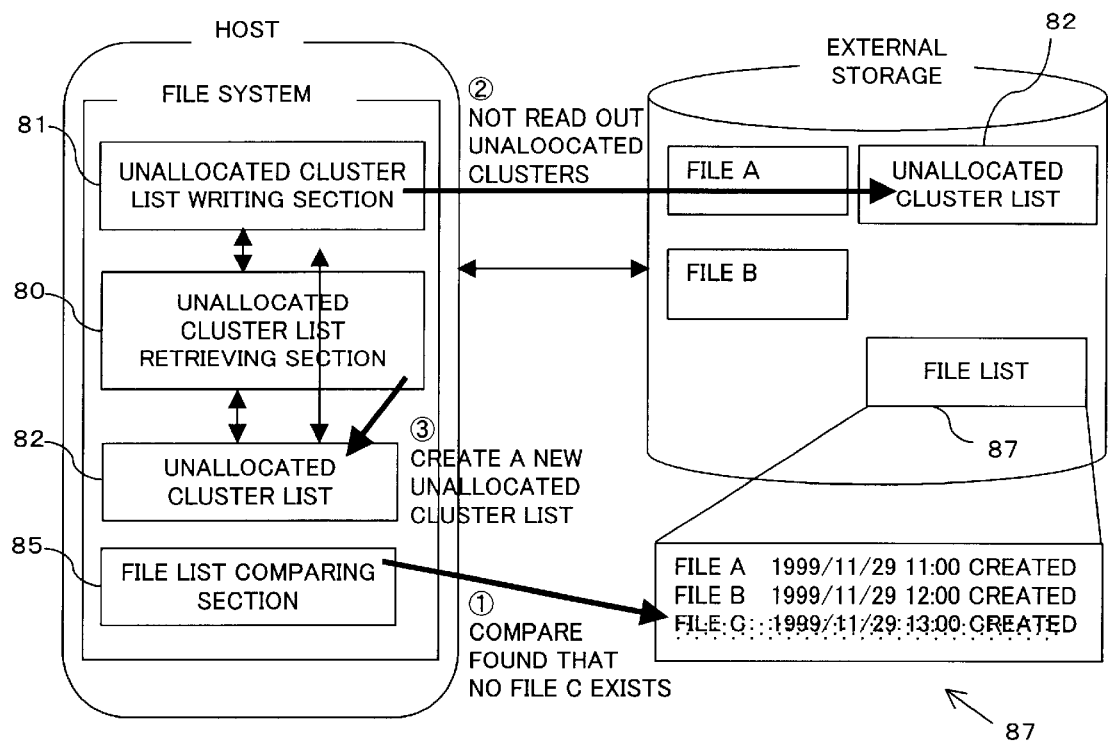

FIG. 14A illustrates the processing to be performed when the power switch is turned off or the recording medium is ejected; and FIG. 14B, the processing to be performed when the power switch is turned on or the recording medium is inserted. The unallocated cluster list writing section 81, as shown in FIG. 14A, writes an unallocated cluster list 82 to the recording medium when the power switch is turned off or the recording medium is ejected. And the unallocated cluster list 82 is read out from the recording medium by the unallocated cluster list writing section 81 when the power switch is turned on or the recording medium is inserted.

The unallocated cluster list checking section 83 checks whether or not the unallocated cluster list 82 exists in the RAM 20 or the recording medium.

When the power switch is turned off or the recording medium is ejected, the file list writing section 84 creates a file list (see FIG. 14A), which registers file names of the files stored in the recording medium and the creation time of the files in correlation with one another, to write the file list 87 to the recording medium.

Assume that there exist three files A, B, C in the recording medium as shown in FIG. 14A. When the power switch is turned off or the recording medium is ejected, the file list writing section 84 creates the file list 87, which registers file names (file A, file B, and file C) and their creation time in correlation with one another, to write the file list 87 to the recording medium.

The file list comparing section 85 compares the content of the file list written in the recording medium with the files actually recorded in the recording medium. If the content of the file list 87 is judged as being different from the files actually recorded in the recording medium when the power switch is turned on or the recording medium is inserted, the file list comparing section 85 notifies the unallocated cluster list retrieving section 80 of the result of the comparison.

The unallocated cluster list retrieving section 80 updates the unallocated cluster list 82 based on the file information actually recorded in the recording medium.

The unallocated cluster list checking section 83 checks whether or not the unallocated cluster list 82 exists in the recording medium to which the data is to be written for the current time. If the unallocated cluster list 82 exists, the unallocated cluster list checking section 83 notifies the unallocated cluster list retrieving section 80 of the result of the checking.

The unallocated cluster list retrieving section 80 consults with the unallocated cluster list 82 to retrieve an unallocated cluster. The unallocated cluster list retrieving section 80 not only creates the unallocated cluster list 82 but also deletes the clusters, to which the data has been newly allocated, in the unallocated cluster list 82. The unallocated cluster list retrieving section 80 also updates the unallocated cluster list 82 by adding the information about the clusters that have newly become unallocated, before deleting the file in the recording medium (described later).

Further, if the file list comparing section 85 has judged the content of the file list written in the recording medium of the storage 60 as being different from the files actually recorded in the storage 60 when the power switch is turned on or the recording medium is inserted, the unallocated cluster list 82 is updated based on information about the actually recorded files.

As shown in FIG. 14B, for example, the file C is deleted in the recording medium by a PC after the power switch is turned off or the recording medium is ejected, so that the file list 87 written in the recording medium is inconsistent with the information (file names) of the files actually recorded in the recording medium.

In this case, the file list comparing section 85 detects such inconsistency, whereupon it is recognized that file C has been deleted. The unallocated cluster list retrieving section 80 can accordingly use a newly created unallocated cluster list 82, without using the unallocated cluster list 82 written in the recording medium and lacking a consistency with the file names actually recorded in the recording medium.

With this construction, for writing data as a file by the file system 70b of the second embodiment, the cluster allocating section 73 calls the cluster retrieving section 72, which then calls the unallocated cluster list retrieving section 80.

After that, the unallocated cluster list retrieving section 80 retrieves unallocated clusters in the unallocated cluster list 82, which is written/managed by the unallocated cluster list writing section 81. The cluster allocating section 73 then allocates data to the unallocated clusters, and then the accessing section 71 writes the data into the unallocated cluster.

Figure 12:
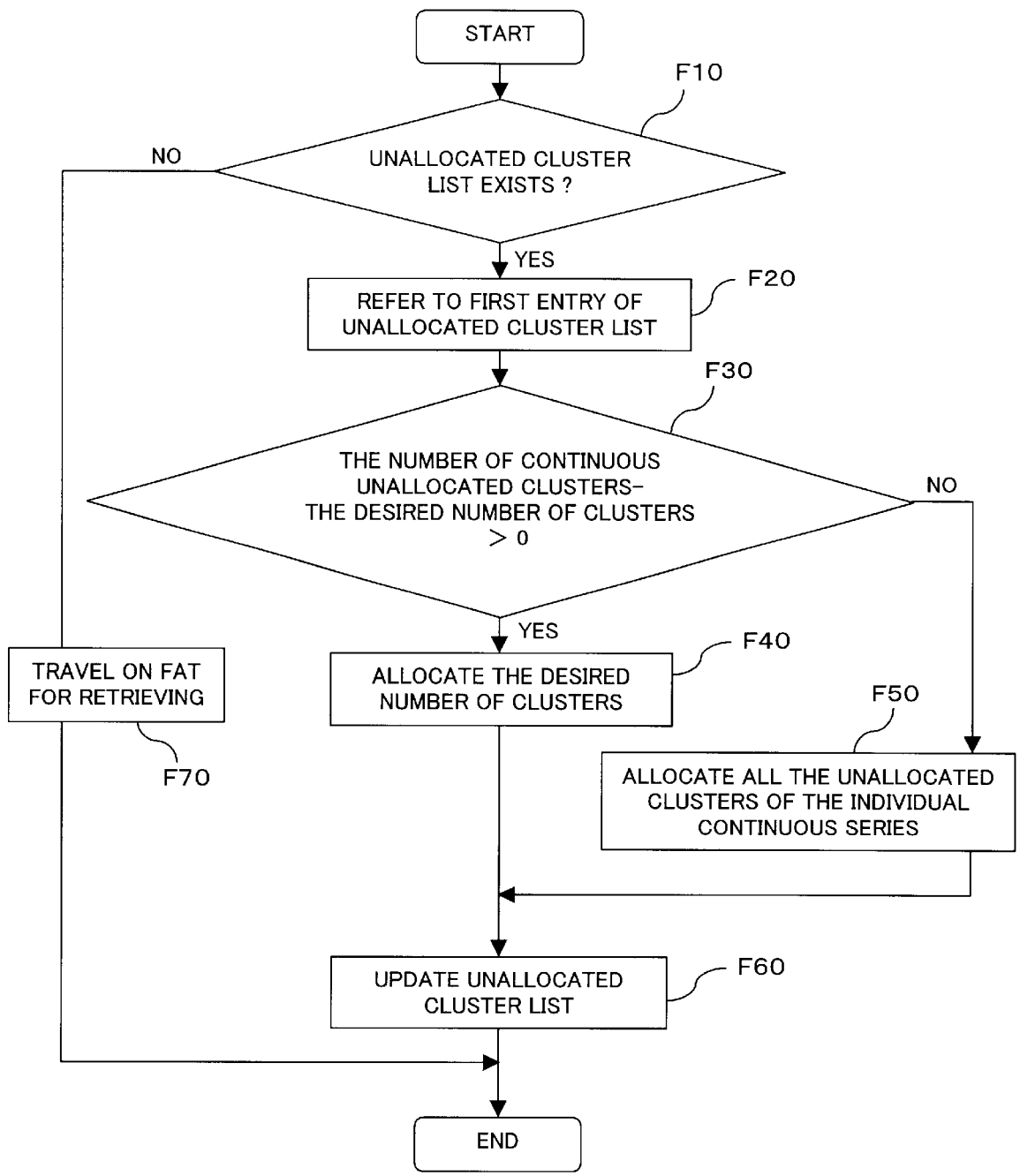
FIG. 12 is a flowchart illustrating how to allocate data to clusters by a cluster list retrieving section of the file system of the second embodiment.

How to allocate data to clusters by the unallocated cluster list retrieving section 80 of the second embodiment will now be described with reference to the flowchart (steps F10 through F70) of FIG. 12.

First of all, the unallocated cluster list checking section 83 discriminates whether or not an unallocated cluster list 82 exists (step F10). If no unallocated cluster list 82 exists (NO route of step F10), the cluster retrieving section 72 travels around the individual entries of the FAT 74 to retrieve unallocated clusters (step F70).

If the unallocated cluster list 82 exists (YES route of step F10), the unallocated cluster list retrieving section 80 consults with the start element of the unallocated cluster list 82 (step F20). The unallocated cluster list retrieving section 80 then calculates (the number of continuous clusters)—(the desired number of clusters), and it is then discriminated whether the result of the calculating has a positive sign or a negative sign (step F30).

Assuming that, data occupying 14 clusters to allocate is recorded in the recording medium of FIGS. 11A and 11B, the start element of the unallocated cluster list 82 of FIG. 11 indicates that there exist a continuous series of 18 unallocated clusters, starting from cluster number 00. Here, 18−14=4, namely, the calculation result has a positive sign.

If the calculation result has a positive sign (YES route of step F30), namely, if the desired number of clusters to allocate data is equal to or smaller than the number of the continuous unallocated clusters succeeding from the head cluster number held in the first element of the unallocated cluster list 82, all the data is allocated to those continuous clusters (step F50). Further, the unallocated cluster list 82 is updated so as to reflect the information after the data allocating (step F60).

Precisely, as indicated by hatching in the FAT 74 of FIG. 11A, after the data is written to the continuous 14 clusters succeeding from cluster number 00, another continuous series of 4 clusters succeeding from cluster number 0E newly becomes unallocated, and the cluster list 82 of FIG. 11C is updated so as to reflect this state.

If the calculation result has a negative sign (NO route of step F30), namely, if the desired number of clusters to allocate data exceeds the number of the continuous unallocated clusters succeeding from the head cluster number held in the first element of the unallocated cluster list 82, the data is allocated to all the continuous unallocated clusters one after another starting from the head cluster number.

The unallocated cluster list retrieving section 80 notifies the accessing section 71 of the result of the data allocating (step F40) before updating the unallocated cluster list 82 (step F60). Likewise, the remaining data will be allocated to other unallocated clusters.

A description will now be made about a storage, in which data is recorded in a disc-shaped recording medium, such as a magnetic disc or a magneto-optical disc, while rotating under the control by the ZCAV (Zone Constant Angular Velocity) method. In this storage, data recording starts separately from the radially inner record region and the radially outer record region of the disc to uniform the transfer ability throughout the whole record regions of the disc. The head cluster corresponds to the inner record region of the recording medium while the end cluster corresponds to the outer record region of the recording medium.

When data recording starts from the inner record region of the recording medium, i.e. from the head cluster, the unallocated cluster list retrieving section 80 consults with the unallocated cluster list 82 to allocate the data.

Or when data recording starts from the outer end of the recording medium, i.e. from the end cluster, the unallocated cluster list retrieving section 80 consults with the unallocated cluster list 82 to find the bottom element, which indicates the head cluster number of the continuous series of clusters. The data allocating starts from the head cluster number indicated in the bottom element.

If the number of clusters needed to allocate data is equal to or smaller than the number of continuous unallocated clusters indicated in the bottom element of the unallocated cluster list 82, the cluster allocating section 73 allocates all the continuous unallocated clusters to the data.

If the number of clusters needed to allocate the data exceeds the number of continuous unallocated clusters indicated by the bottom element of the unallocated cluster list 82, the cluster allocating section 73 allocates the data to all the continuous unallocated clusters, and then notifies the accessing unit 71 of the result of the data allocating.

After that, the unallocated cluster list retrieving section 80 deletes the head cluster, to which the data has been newly allocated, in the unallocated cluster list 82 to update the unallocated cluster list 82.

In this instance, since the unallocated cluster list 82 registers relation information linking the information (head cluster number) registered for each continuous set of clusters with the information registered for other continuous sets, the unallocated cluster list retrieving section 80 can update the unallocated cluster list 82 without traveling around the individual elements of the unallocated cluster list 82 one after another from the top element.

How to delete a file in a recording medium will now be described with reference to FIGS. 13A through 13C. FIG. 13A schematically shows the FAT 74; FIGS. 13B, the unallocated cluster list 82 before updated; and FIG. 13C, the unallocated cluster list 82 after updated.

The cluster retrieving section 72 consults with the FAT 74 to find the individual set of clusters to which a file (data sequence) to be deleted is allocated. The information about such set of clusters is added to the unallocated cluster list 82, and the file is then deleted in the recording medium before updating the FAT 74.

At that time, before the new element is added to the unallocated cluster list 82, it is discriminated whether or not the clusters to be newly added as unallocated are continuous with other registered clusters in cluster numbers. If the discrimination result is positive, the number of clusters to be newly added is added to the number of the continuous unallocated clusters having been registered in the corresponding element of the unallocated cluster list 82.

Assuming that, the file allocated to the clusters of cluster numbers 52 through 59 is deleted in the recording medium of FIGS. 13A and 13B, these clusters of cluster numbers 52 through 59 newly become unallocated so that the clusters of cluster numbers 46 through 5F form one continuous series. The cluster retrieving section 72, as shown in FIG. 13C, updates the number (12 in FIG. 13B) of the continuous unallocated clusters registered in correlation with head cluster number 46, to the newly obtained number (26 in FIG. 13C).

Otherwise if determined that the clusters to be newly added are discontinuous with other registered clusters in numbers, the head cluster number of the continuous unallocated clusters is registered in the unallocated cluster list 82 in correlation with the number of such continuous unallocated clusters.

Assuming that a file allocated to the clusters of cluster numbers 70 through 73 is deleted in the recording medium of FIGS. 13A and 13B, these clusters 70 through 73 become unallocated, thereby forming a new isolated series of continuous unallocated clusters. The cluster retrieving section 72, as shown in FIG. 13C, adds an element to the unallocated cluster list 82, in which element the head cluster number is 70 and the number of continuous unallocated clusters is 4.

In this manner, with the file system 70b of the second embodiment, the unallocated cluster list retrieving section 80 retrieves unallocated clusters using the unallocated cluster list 82, which registers the head cluster number of each series of continuous unallocated clusters and the number of the continuous unallocated clusters in association with one another, and which also registers relation information symmetrically liking the head cluster number registered for each continuous series with the head cluster numbers registered for other continuous series. It is therefore possible to reduce the time needed for consulting with the FAT 74 to retrieve the unallocated clusters, thus speeding up the retrieving.

Particularly since the high-speed retrieving can be attained even when the retrieving is performed in the FAT in the backward direction (in the descending direction of cluster numbers), the data can be recorded in the recording medium at high speed starting from its outer circumference, or from the end cluster. Accordingly, even if data recording is started separately from the inner and outer circumferential regions of the recording medium, it is unnecessary to travel the individual entries of the FAT 74 one after another from the top one, thus speeding up the processing.

Further, partly since the jump table retrieving section 75 consults with the unallocated cluster list 82 to retrieve unallocated clusters, to which the unallocated cluster list writing section 81 then allocates the data of a file, and partly since such clusters, to which the data is allocated, are deleted in the unallocated cluster list 82, it is possible to create the unallocated cluster list 82 consistent with the actual unallocated clusters.

Since the unallocated cluster list retrieving section 80 creates the unallocated cluster list 82 when the power switch is turned on or the recording medium is inserted, the unallocated cluster list 82 is made consistent with the actual data-unallocated clusters of the recording medium at each turning-on of the power switch or each insertion of the recording medium, thus guaranteeing an increased degree of reliability.

For deleting a file, information about the clusters having newly become unallocated as the result of the file deleting is added to the unallocated cluster list 82, so that all the unallocated clusters including such newly unallocated clusters can be used for data recording.

Further, partly since the unallocated cluster list 82 is written to the recording medium when the power switch is turned off or the recording medium is ejected, and partly since the unallocated cluster list 82 is then read out from the recording medium when the power switch is turned on or the recording medium is inserted, it is unnecessary to create the unallocated cluster list 82 at the first using of the recording medium after once turning-off of the power switch or after each ejection of the recording medium, thus speeding up the processing.

If the file list comparing section 85 has judged, when the power switch is turned on or the recording medium is inserted, that content of the file list 87 is different from the actually recorded file in the recording medium, the unallocated cluster list 82 is updated based on the file information written in the recording medium. The unallocated cluster list 82 thereby becomes consistent with the actually recorded file in the recording medium at each turning-on of the power switch or each insertion of the recording medium, thus guaranteeing an increased degree of reliability.

Further, the file list comparing section 85 writes the file list 87 to the recording medium, which file list 87 holds file names of the files recorded in the recording medium and the time of the creation of those files, at turning off the power switch or ejecting the recording medium. According to the file list, it is possible to keep the unallocated cluster list written in the recording medium consistent with the actually recorded file in the recording medium even if the content of the recording medium is changed afterward by a PC or the like.

(C) Third Embodiment:

The present invention should by no means be limited to the above-illustrated embodiments, and various changes or modifications may be suggested without departing from the gist of the invention.

Figure 15:
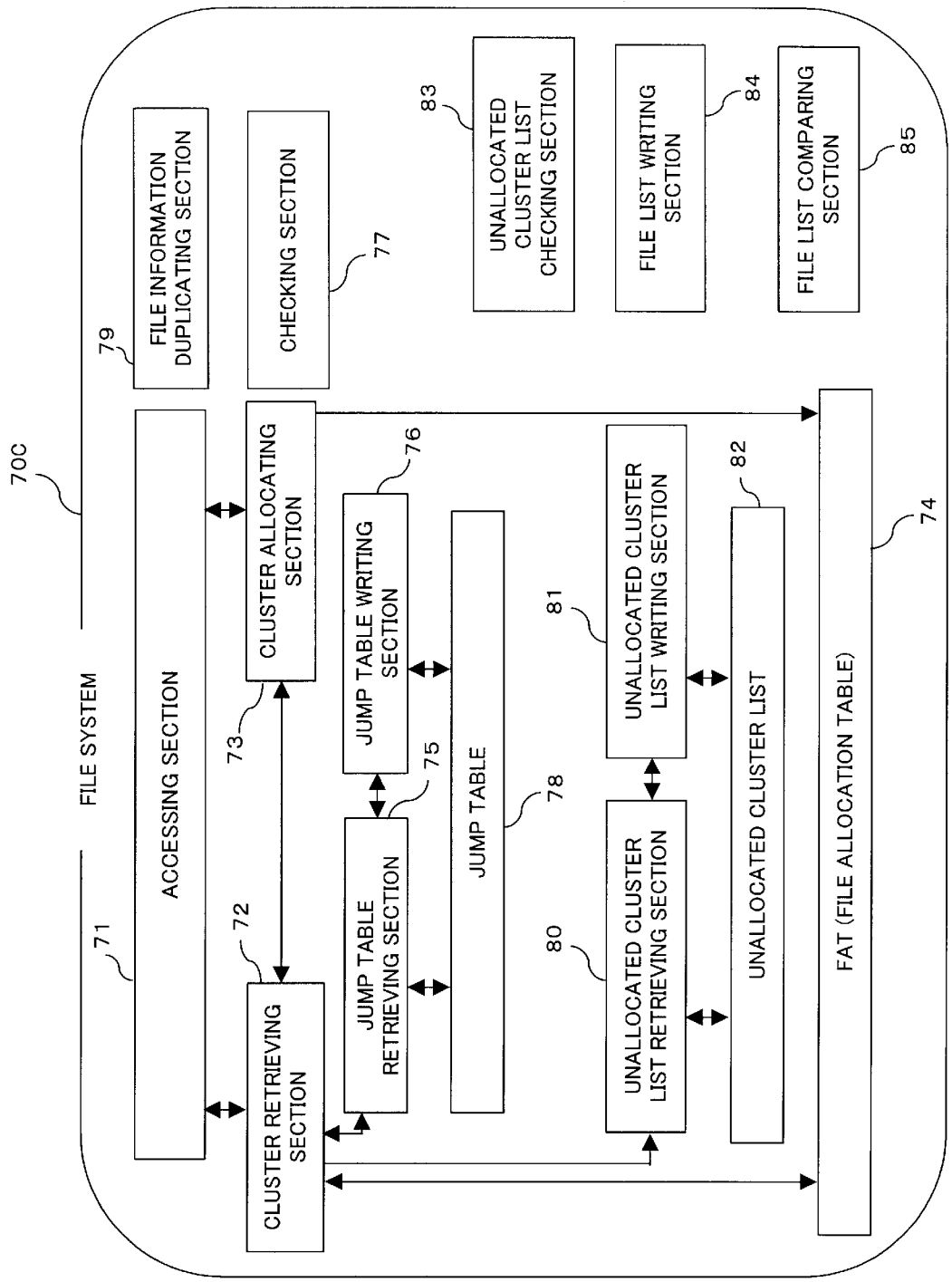
FIG. 15 is a block diagram schematically showing a file system according to a third embodiment of the present invention.

For example, FIG. 15 shows a file system 70c of a third embodiment. The file system of FIG. 15 is equipped with the function of the file system 70a of the first embodiment and that of the file system 70b of the second embodiment. Like reference numbers designate similar parts or elements throughout several views of the various embodiments, so their description is omitted here.

In the file system 70c, when data recording into the recording medium by the accessing section 71, the cluster allocating section 73 allocates unallocated clusters to the data. At that time, if a cluster offset of the new file to be recorded can be divided by the distance between the cluster offsets in the jump table 78, another entry of the jump table 78 is created and added, so that the jump table 78 can be created during the creating of the file. It is therefore possible to take random access even to a file, which is currently being created, at high speed.

Since the unallocated cluster list 82 is created when the power switch is turned on or the recording medium is inserted, the unallocated cluster list 82 becomes consistent with the files actually recorded in the recording medium at each turning-on of the power switch or each insertion of the recording medium, thus guaranteeing an increased degree of reliability.

In the foregoing embodiments, the jump table retrieving section 75 creates/updates the jump table 78. However the present invention should by no means be limited to this illustrated examples; alternatively another element such as the jump table writing section 76 may serve as the jump table retrieving section 75.

Further, in the foregoing embodiments, the unallocated cluster list retrieving section 80 creates/updates the unallocated cluster list 82. Alternatively another element such as the unallocated cluster list writing section 81 may serve as the unallocated cluster list retrieving section 80.

Furthermore, in the foregoing embodiments, a cluster is a smallest unit of record area of the recording medium. Any element other than the cluster may be used as a smallest unit of record area.

What is claimed is:

1. A file system for reading an object file from a recording medium in which one or more files are recorded each in the form of a data sequence, comprising:

an accessing section for taking access to the recording medium to read out said object file in terms of unit record areas in the recording medium;

a file allocation table for managing address information about said unit record areas in which said object file is recorded;

a unit record area retrieving section for retrieving particular one or more set of said unit record areas to which said object file is allocated, by referring said file allocation table;

one or more jump tables, provided one for each file, in which each jump table (i) location information about individual data locations from the start of said each file and (ii) unit-record-area numbers corresponding to the individual data locations are registered in terms of predetermined distances from the start of said each file in said file allocation table; and a jump table retrieving section for retrieving a particular unit-recording-area number from one of said jump tables which corresponds to said object file;

when said object file is read from the recording medium, said jump table retrieving section retrieves a unit-record-area number corresponding to the unit record area to which desired individual data of said object file is allocated or a unit-record-area number near desired individual data of said object file, said unit record area retrieving section retrieves a unit record area containing said desired data by referring said file allocation table based on said unit-record-area number retrieved by said jump table retrieving section, and said accessing section reads out said desired individual data recorded in said unit record area retrieved by said unit record area retrieving section.

2. A file system according to claim 1, wherein:

said file system further comprises a unit record area allocating section for allocating the data of the individual file to said unallocated unit record areas;

said file allocation table manages unallocated unit record areas; and after said unit record area allocating section has allocated the last-named data of the individual file to said unallocated unit record areas, said jump table retrieving section extracts said unit-record-area numbers at said predetermined distances to create said jump table corresponding to the individual file.

3. A file system according to claim 1, further comprising a jump table writing section for writing said jump tables to the recording medium so that said one jump table corresponding to said object file is read from the recording medium when said object file is read out.

4. A file system according to claim 2, further comprising a jump table writing section for writing said jump tables to the recording medium so that said one jump table corresponding to said object file is read from the recording medium when said object file is read out.

5. A file system according to claim 3, wherein said one jump table corresponding to said object file is deleted from the recording medium when said object file is deleted.

6. A file system according to claim 4, wherein said one jump table corresponding to said object file is deleted from the recording medium when said object file is deleted.

7. A file system according to claim 1, further comprising a jump table checking section for checking whether or not said one jump table corresponding to said object file exists so that, if the result of the checking by said jump table checking section is negative, said one jump table is created based on said file allocation table.

8. A file system according to claim 2, further comprising a jump table checking section for checking whether or not said one jump table corresponding to said object file exists so that, if the result of the checking by said jump table checking section is negative, said one jump table is created based on said file allocation table.

9. A file system according to claim 3, further comprising a jump table checking section for checking whether or not said one jump table corresponding to said object file exists so that, if the result of the checking by said jump table checking section is negative, said one jump table is created based on said file allocation table.

10. A file system according to claim 4, further comprising a jump table checking section for checking whether or not said one jump table corresponding to said object file exists so that, if the result of the checking by said jump table checking section is negative, said one jump table is created based on said file allocation table.

11. A file system according to claim 5, further comprising a jump table checking section for checking whether or not said one jump table corresponding to said object file exists so that, if the result of the checking by said jump table checking section is negative, said one jump table is created based on said file allocation table.

12. A file system according to claim 6, further comprising a jump table checking section for checking whether or not said one jump table corresponding to said object file exists so that, if the result of the checking by said jump table checking section is negative, said one jump table is created based on said file allocation table.

13. A file system according to claim 1, further comprising an updated time checking section for comparing an updated time of said object file and an updated time of said one jump table corresponding to said object file so that, if said updated time of said object file is more recent than said updated time of said one jump table as the result of the checking, said one jump table is updated.

14. A file system according to claim 1, further comprising a file checking section for checking whether or not said object file corresponding to said one jump table exists so that, if the result of the checking by said file checking section is negative, said one jump table is deleted.

15. A file system according to claim 1, further comprising a file information duplicating section for duplicating file information over various processes for one and the same file prior to such processing of the last-named file.

16. A file system for writing a data sequence to a recording medium as an object file, comprising:
 an accessing section for taking access to the recording medium to write said object file in terms of unit record areas in the recording medium;
 a file allocation table for managing address information about said unit record areas in which said object file is recorded;
 a unit record area retrieving section for retrieving a particular one or more set of said unit record areas to which said object file is allocated, by referring said file allocation table;
 a unit record area allocating section for allocating the data of the individual file to said unallocated unit record areas;
 an unallocated unit record area list in which (i) a unit-record-area number of the start of each of continuous unallocated unit record areas of different isolated sets in the recording medium and (ii) the number of the continuous unallocated unit record areas of each set, succeeding from the starting unallocated unit record area, are registered in association with one another and in which (iii) relation information symmetrically liking such information registered for each set with that registered for other sets is registered; and
 an unallocated unit record area retrieving section for retrieving an isolated set of continuous unallocated unit record areas by referring said unallocated unit record area list;
 when said object file is written to the recording medium,
 said unallocated unit recording area retrieving section retrieves the unallocated unit record area based on said unallocated unit record area list,
 said unit recording area allocating section allocates individual data of said object file to the unallocated record areas retrieved by said unallocated unit recording area retrieving section, and
 unit record areas to which individual data of said object file is allocated are deleted from said unallocated unit record area list.

17. A file system according to claim 16, wherein said unallocated unit record area list is created when a power switch is turned on or said recording medium is inserted.

18. A file system according to claim 16, wherein information about unit recording areas having newly become unallocated when said object file is deleted is added to said unallocated unit record area list.

19. A file system according to claim 17, wherein information about unit recording areas having newly become unallocated when said object file is deleted is added to said unallocated unit record area list.

20. A file system according to claim 16, wherein said unallocated unit record area list is recorded in the recording medium when a power switch is turned off or the recording medium is ejected, and said unallocated unit record area list is read from the recording medium when the power switch is turned on or the recording medium is inserted.

21. A file system according to claim 17, wherein said unallocated unit record area list is recorded in the recording medium when a power switch is turned off or the recording medium is ejected, and said unallocated unit record area list is read from the recording medium when the power switch is turned on or the recording medium is inserted.

22. A file system according to claim 18, wherein said unallocated unit record area list is recorded in the recording medium when a power switch is turned off or the recording medium is ejected, and said unallocated unit record area list is read from the recording medium when the power switch is turned on or the recording medium is inserted.

23. A file system according to claim 19, wherein said unallocated unit record area list is written in the recording medium when a power switch is turned off or the recording medium is ejected, and said unallocated unit record area list is read from the recording medium when the power switch is turned on or the recording medium is inserted.

24. A file system according to claim 20, further comprising:
 a file list writing section for writing a file list, in which file names of the files recorded in the recording medium and times of creation of the recorded files are registered in association with one another, when the power switch is turned off or the recording medium is ejected; and a file list comparing section for comparing content of said file list written in the recording medium with the files actually recorded in the recording medium, so that if the content of said file list written in the recording medium is different from the files actually recorded in the recording medium as the result of the comparing, said unallocated unit record area list is updated, based on information about said actually recorded files, when the power switch is turned on or the recording medium is inserted.

25. A file system according to claim 21, further comprising:

a file list writing section for writing a file list, in which files names of the files recorded in the recording medium and times of creation of the recorded files are registered in association with one another, when the power switch is turned off or the recording medium is ejected; and a file list comparing section for comparing content of said file list written in the recording medium with the files actually recorded in the recording medium, so that if the content of said file list written in the recording medium is different from the files actually recorded in the recording medium as the result of the comparing, said unallocated unit record area list is updated, based on information about said actually recorded files, when the power switch is turned on or the recording medium is inserted.

26. A file system according to claim 22, further comprising:

a file list writing section for writing a file list, in which files names of the files recorded in the recording medium and times of creation of the recorded files are registered in association with one another, when the power switch is turned off or the recording medium is ejected; and a file list comparing section for comparing content of said file list written in the recording medium with the files actually recorded in the recording medium, so that if the content of said file list written in the recording medium is different from the files actually recorded in the recording medium as the result of the comparing, said unallocated unit record area list is updated, based on information about said actually recorded files, when the power switch is turned on or the recording medium is inserted.

27. A file system according to claim 23, further comprising:

a file list writing section for writing a file list, in which files names of the files recorded in the recording medium and times of creation of the recorded files are registered in association with one another, when the power switch is turned off or the recording medium is ejected; and a file list comparing section for comparing content of said file list written in the recording medium with the files actually recorded in the recording medium, so that if the content of said file list written in the recording medium is different from the files actually recorded in the recording medium as the result of the comparing, said unallocated unit record area list is updated, based on information about said actually recorded files, when the power switch is turned on or the recording medium is inserted.

28. A file system according to claim 16, further comprising a file information duplicating section for duplicating file information over various processes for one and the same file prior to such processing of the last-named file.

29. A file system for writing a sequence of data to a recording medium as an object file and reading the object file from the recording medium, comprising:

an accessing section for taking access to the recording medium to write/read said object file in terms of unit record areas in the recording medium;

a file allocation table for managing address information about said unit record areas in which said object file is recorded;

a unit record area retrieving section for retrieving particular one or more set of said unit record areas to which said object file is allocated, by referring said file allocation table;

one or more jump tables, provided one for each file, in which each jump table (i) location information about individual data locations from the start of said each file and (ii) unit-record-area numbers corresponding to the individual data locations are registered in terms of predetermined distances from the start of said each file in said file allocation table;

a jump table retrieving section for retrieving a particular unit-recording-area number from one of said jump tables which corresponds to said object file;

a unit record area allocating section for allocating the data of the individual file to said unallocated unit record areas;

an unallocated unit record area list in which (i) a unit-record-area number of the start of each of continuous unallocated unit record areas of different isolated sets in the recording medium and (ii) the number of the continuous unallocated unit record areas of each set, succeeding from the starting unallocated unit record area, are registered in association with one another and in which (iii) relation information symmetrically liking such information registered for each set with that registered for other sets is registered; and an unallocated unit record area list retrieving section for retrieving an isolated set of continuous unallocated unit record areas by referring said unallocated unit record area list;

when said object file is written to the recording medium, said unallocated unit recording area retrieving section retrieves the unallocated unit record area based on said unallocated unit record area list, said unit recording area allocating section allocates individual data of said object file to the unallocated record areas retrieved by said unallocated unit recording area retrieving section, and unit record areas to which individual data of said object file is allocated are deleted from said unallocated unit record area list;

when said object file is read from the recording medium, said jump table retrieving section retrieves a unit-record-area number corresponding to the unit record area to which desired individual data of said object file is allocated or a unit-record-area number near desired individual data of said object file, said unit record area retrieving section retrieves a unit record area containing said desired data by referring said file allocation table based on said unit-record-area number retrieved by said jump table retrieving section, and said accessing section reads out said desired individual data recorded in said unit record area retrieved by said unit record area retrieving section.

30. A file system according to claim 29, wherein said unallocated unit record area list is created when a power switch is turned on or said recording medium is inserted into the recording medium.

31. A file system according to claim 29, wherein information about unit recording areas having newly become unallocated when said object file is deleted is added to said unallocated unit record area list.

32. A file system according to claim 30, wherein information about unit recording areas having newly become unallocated when said object file is deleted is added to said unallocated unit record area list.

33. A file system according to claim 29, wherein said unallocated unit record area list is recorded in the recording medium when a power switch is turned off or the recording medium is ejected, and said unallocated unit record area list is read from the recording medium when the power switch is turned on or the recording medium is inserted.

34. A file system according to claim 30, wherein said unallocated unit record area list is recorded in the recording medium when a power switch is turned off or the recording medium is ejected, and said unallocated unit record area list is read from the recording medium when the power switch is turned on or the recording medium is inserted.

35. A file system according to claim 31, wherein said unallocated unit record area list is recorded in the recording medium when a power switch is turned off or the recording medium is ejected, and said unallocated unit record area list is read from the recording medium when the power switch is turned on or the recording medium is inserted.

36. A file system according to claim 32, wherein said unallocated unit record area list is written in the recording medium when a power switch is turned off or the recording medium is ejected, and said unallocated unit record area list is read from the recording medium when the power switch is turned on or the recording medium is inserted.

37. A file system according to claim 33, further comprising:

a file list writing section for writing a file list, in which files names of the files recorded in the recording medium and times of creation of the recorded files are registered in association with one another, when the power switch is turned off or the recording medium is ejected; and a file list comparing section for comparing content of said file list written in the recording medium with the files actually recorded in the recording medium, so that if the content of said file list written in the recording medium is different from the files actually recorded in the recording medium as the result of the comparing, said unallocated unit record area list is updated, based on information about said actually recorded files, when the power switch is turned on or the recording medium is inserted.

38. A file system according to claim 34, further comprising:

a file list writing section for writing a file list, in which files names of the files recorded in the recording medium and times of creation of the recorded files are registered in association with one another, when the power switch is turned off or the recording medium is ejected; and a file list comparing section for comparing content of said file list written in the recording medium with the files actually recorded in the recording medium, so that if the content of said file list written in the recording medium is different from the files actually recorded in the recording medium as the result of the comparing, said unallocated unit record area list is updated, based on information about said actually recorded files, when the power switch is turned on or the recording medium is inserted.

39. A file system according to claim 35, further comprising:

a file list writing section for writing a file list, in which files names of the files recorded in the recording medium and times of creation of the recorded files are registered in association with one another, when the power switch is turned off or the recording medium is ejected; and a file list comparing section for comparing content of said file list written in the recording medium with the files actually recorded in the recording medium, so that if the content of said file list written in the recording medium is different from the files actually recorded in the recording medium as the result of the comparing, said unallocated unit record area list is updated, based on information about said actually recorded files, when the power switch is turned on or the recording medium is inserted.

40. A file system according to claim 36, further comprising:

a file list writing section for writing a file list, in which files names of the files recorded in the recording medium and times of creation of the recorded files are registered in association with one another, when the power switch is turned off or the recording medium is ejected; and a file list comparing section for comparing content of said file list written in the recording medium with the files actually recorded in the recording medium, so that if the content of said file list written in the recording medium is different from the files actually recorded in the recording medium as the result of the comparing, said unallocated unit record area list is updated, based on information about said actually recorded files, when the power switch is turned on or the recording medium is inserted.

41. A file system according to claim 29, further comprising a file information duplicating section for duplicating file information over various processes for one and the same file prior to such processing of the last-named file.

* * * * *

UNITED STATES PATENT AND TRADEMARK OFFICE
CERTIFICATE OF CORRECTION

PATENT NO. : 6,658,439 B2
DATED : December 2, 2003
INVENTOR(S) : Akira Karasudani It is certified that error appears in the above-identified patent and that said Letters Patent is hereby corrected as shown below:

Title page,
Item [54], Title, change to: -- FILE SYSTEM TO RECORD DATA SEQUENCE AS FILE IN A RECORDING MEDIUM --.

Column 20,
Line 16, change "set" to -- sets --.

Column 21,
Line 65, change "set" to -- sets --.

Column 22,
Line 11, change "liking" to -- linking --.

Column 24,
Line 16, change "set to -- sets --.
Line 41, change "liking" to -- linking --.

Signed and Sealed this

Thirteenth Day of December, 2005

JON W. DUDAS
*Director of the United States Patent and Trademark Office*